US012810556B2

(12) United States Patent
Wannerberg et al.

(10) Patent No.: US 12,810,556 B2
(45) Date of Patent: Nov. 24, 2026

(54) SPATIAL MULTI STREAMING OF XR CONTENT

(71) Applicant: Adeia Guides Inc., San Jose, CA (US)

(72) Inventors: Petter Wannerberg, Lidingö (SE); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 327 days.

(21) Appl. No.: 18/375,346

(22) Filed: Sep. 29, 2023

(65) Prior Publication Data

US 2025/0111617 A1 Apr. 3, 2025

(51) Int. Cl.
*G06T 19/00* (2011.01)
*H04L 67/131* (2022.01)

(52) U.S. Cl.
CPC .......... *G06T 19/006* (2013.01); *H04L 67/131* (2022.05)

(58) Field of Classification Search
CPC ............................ G06T 19/006; H04L 67/131
USPC .......................................................... 345/633
See application file for complete search history.

(56) References Cited

U.S. PATENT DOCUMENTS

2017/0354875 A1* 12/2017 Marks .................. A63F 13/213
2020/0233502 A1 7/2020 Goldberg et al.
2020/0319702 A1 10/2020 Perkins
2021/0192851 A1* 6/2021 Doptis .................... A63F 13/65
2022/0301264 A1* 9/2022 O'Leary ............ G01C 21/3664
2024/0112422 A1* 4/2024 Araumi ............... H04W 64/003
2024/0187819 A1* 6/2024 Drummond ....... H04M 1/72457
2025/0111616 A1 4/2025 Wannerberg et al.

OTHER PUBLICATIONS

"Owlchemy Lab Report: Mobile Spectator—AR Spectator Camera Experiment," (Oct. 2, 2018), (4 pages), (https://owlchemylabs.com/blog/owlchemy-mobile-spectator-ar-spectator-camera).
"Self-Clocked Rate Adaptation for Multimedia," (Dec. 2017),(36 pages), (https://www.rfc-editor.org/rfc/rfc8298.html).
U.S. Appl. No. 18/375,345, filed Sep. 29, 2023, Petter Wannerberg.

* cited by examiner

*Primary Examiner* — Jin Ge
(74) *Attorney, Agent, or Firm* — HG Law LLP

(57) ABSTRACT

The disclosure relates to method for supervising a plurality of users of XR devices. A problem arises in that a supervisor hoping to assist a user in operating in the XR environment cannot easily obtain a representation of the XR environment which a particular user amongst the plurality of users is currently perceiving. The disclosure addresses this problem by having each XR device and a supervisory device independently determine the position of an XR device. Each XR device provides replica stream data in association with its position, and the user of the supervisory device selects an XR device by selecting its position. By tallying the position in the supervisor's selection of an XR device with the position associated with each replica stream, the replica stream of the XR device selected by the supervisor can be provided to the supervisory device.

20 Claims, 17 Drawing Sheets

SPATIAL MULTI STREAMING OF XR CONTENT

BACKGROUND

XR devices (e.g., Virtual Reality (VR) displays and Augmented Reality (AR) displays) are becoming more and more affordable, and prevalent as consumer and enterprise devices. Using an XR device to its full potential, however, requires some heavy practical self-training from the XR device user in order to become proficient in the use of an XR environment.

SUMMARY

Having an additional person able to access and view a real-time stream consumed by an XR device user, and to help guide the XR device user in an XR environment in real time would considerably lower the difficulty of the XR device user's training. Furthermore, this additional person would be in a position, for instance, to monitor, in the stream, the occurrence of events that could offend the XR device user, to surveil whether the XR device user is consuming the stream they are supposed to be consuming, to simply enjoy the stream consumed by the XR device user, and/or to act as a commentator on the XR device user's actions. There is thus a need for having a device, controlled by the additional person, able to seamlessly access a stream rendered by an XR device, more precisely a replica stream representing what it is currently rendering, or switch between multiple replica streams. Hereinafter, the additional person and the device controlled by the additional person are to be called the moderator and the supervisory device, respectively.

In one aspect, the disclosure relates to a method for operating a supervisory device to supervise a plurality of XR device users. A problem arises in that a supervisor hoping to assist a user in operating in the XR environment cannot easily obtain a representation of the XR environment which a particular user amongst the plurality of users is currently perceiving. The disclosure tackles this problem by receiving, from a user of the supervisory device, a selection of a location of a particular XR device. The supervisory device responds by retrieving a replica stream associated with the XR device at the selected location, and generating the replica stream for display on the supervisory device.

In some embodiments, the supervisory device generates and displays a map including map symbols representing the XR devices, with an overlay of the replica stream of one or more of the XR devices being placed on the map in association with the map symbols representing the respective XR devices.

In other embodiments, the supervisory device includes camera apparatus, obtains a live video from the camera, and displays the live video from the camera apparatus with one or more overlays representing the replica stream of one or more of the respective XR devices, each overlay being displayed in association with the image of the corresponding XR device in the live video.

The present disclosure relates to methods and systems for operating a supervisory device able to access replica streams representing what multiple extended reality (XR) devices are currently rendering. More particularly, but not exclusively, the present disclosure relates to the seamless access, by the supervisory device, to replica streams, each replica stream representing what a XR device of a plurality of XR devices is currently rendering, and the plurality of XR devices and the supervisory device may be located in a given zone.

Methods and systems are thus provided herein for operating a supervisory device. Position data representing a position of each of a plurality of XR devices in association with connection information data representing connection information relating to each of a plurality of XR devices, wherein the connection information comprises a source of a replica stream representing in real-time what is perceived by a user of the XR device, are received. Additionally, mapping data mapping the position data of each XR device to the associated connection information are stored. Furthermore, a selection of a position of an XR device of the plurality of XR devices to select an XR device is received. Moreover, based on the received selection, the connection information associated with the selected XR device are determined using the mapping data. In addition, the replica stream of the selected XR device is retrieved, using the determined connection information. Furthermore, the replica stream of the selected XR device is generated for display.

In this way, the supervisory device is able to present the replica stream relating to the XR device selected from the plurality of XR devices, using the position data and the connection information of the selected XR device. The moderator may then train, teach, or surveil an XR device user in real time. The moderator may also control, censor, comment, and describe or experience the content of a stream consumed by an XR device user in real time.

As referred to herein, the term 'stream' should be understood to mean data (e.g., video data, audio data or any combination thereof) that are transferred directly or indirectly from a device to another device, and may then be presented on the other device to be consumed as soon as they are received by the other device.

As referred to herein, the term 'replica stream' relating to an XR device should be understood to mean a stream representing what the XR device is currently rendering.

Each stream is rendered by an XR device of the plurality of XR devices and the corresponding replica stream may be then transferred, on the moderator's request, to the supervisory device. If the XR device in question is a VR display, the XR device may begin to encode and transmit the VR display-rendered stream to the supervisory device on the moderator's request. If the XR device in question is an AR display, the XR device may generate a camera view (containing for instance AR display users) with virtual elements (e.g., a stream, a virtual character) via an AR see-through display, and encode and transmit the camera view augmented with the virtual elements to the supervisory device on the moderator's request.

In some examples, the supervisory device may be in communication with the plurality of XR devices via a single communication network, such as a Wide Area Network (WAN). Each XR device may send a replica stream representing what it is current rendering, to a remote server via the WAN. The supervisory device may utilize the remote server to receive the replica stream from the XR device. The remote server may receive all the replica streams at all times. Alternatively, the remote server may receive the replica streams only on demand due to bandwidth limitations dependent, in part, on the number of XR devices. A stream database connected to the remote server may store the replica streams. Each XR device may broadcast (continuously, occasionally, periodically, every 5 to 10 seconds, every 10 to 60 seconds, or every one to two minutes), over the WAN communication network, position data along with connection information (e.g., URL). The supervisory device receives the broadcasting (continuously, occasionally, periodically, every 5 to 10 seconds, every 10 to 60 seconds, or every one to two minutes), by each XR device, of the position data (e.g., spatial coordinates) and connection information (e.g., URL) over the WAN communication network. To access a replica stream relating to a selected XR device, the supervisory device may make a request, via the WAN, to the remote server. In an example, the request contains the position data and/or connection information (e.g., URL) relating to the selected XR device. The supervisory device then reads the URL relating to the selected XR device in order to find the remote server and fetch the replica stream from the remote server. The supervisory device then presents the replica stream via the supervisory device to the moderator. In this case, the supervisory device may simultaneously seamlessly access and simultaneously present multiple replica streams, or present only one of the multiple Replica streams.

In some examples, the supervisory device may be in communication with the plurality of XR devices via a single communication network, such as a Local Area Network (LAN). The plurality of XR devices may broadcast (continuously, occasionally, periodically, every 5 to 10 seconds, every 10 to 60 seconds, or every one to two minutes) the position data (e.g., spatial coordinates) and connection information (e.g., URL) over the LAN communication network to which is connected the supervisory device. Once a connection to a local server (connected to the LAN) is requested by the supervisory device, the selected XR device will start an audio encoder encoding the audio and a video encoder encoding the XR device viewport to prepare the replica stream representing what the XR device is currently rendering. The encoded video and audio will be multiplexed and transmitted over the LAN via RTP (Real-time Transport Protocol) to the selected XR device-related network address: port (e.g., URL) of the local server. The supervisory device then reads the URL relating to the selected XR device in order to find the local server and fetch the replica stream from the local server. The replica stream relating to the selected XR device is presented via the supervisory device. The use of a LAN to transfer the streams from the plurality of XR devices to the supervisory device offers low latency and high bandwidth, while the use of a WAN to perform this task provides high latency and low bandwidth.

In some examples, the supervisory device may be in communication with the plurality of XR devices via a combination of two communication networks. The transfer of a replica stream (representing what a XR device is currently rendering) to the supervisory device may utilize a combination of two communication networks of different types (e.g., WAN and LAN), the combination further utilizing two servers of different types (e.g., a remote server and a local server). For instance, each XR device may broadcast (continuously, occasionally, periodically, every 5 to 10 seconds, every 10 to 60 seconds, or every one to two minutes), over the LAN, the position data along with the connection information (e.g., URL). The connection information (e.g., URL) may, however, refer to the other server, the remote server, which receives the replica streams at all times or on demand due to bandwidth limitations dependent in part on the number of XR devices. A stream database connected to the remote server may store the replica streams. The supervisory device receives the broadcasting, by each XR device, of the position data and WAN-related connection information (e.g., URL) over the LAN, the broadcasting occurring continuously, occasionally, periodically, every 5 to 10 seconds, every 10 to 60 seconds or every one to two minutes. To access a replica stream representing what a XR device is currently relating to a selected XR device, the supervisory device may make a request, via the WAN, to the remote server, the request containing, for instance, the position data and/or the connection information (e.g., URL) of the selected XR device. The supervisory device then reads the URL relating to selected XR device in order to find the remote server and fetch the replica stream relating to the selected XR device from the remote server. The supervisory device then presents the replica stream to the moderator. In this case, the supervisory device may simultaneously seamlessly access and simultaneously present multiple replica streams.

In some examples, each XR device may broadcast continuously, occasionally, periodically, every 5 to 10 seconds, every 10 to 60 seconds, or every one to two minutes, over a communication network (e.g., WAN or LAN), the position data along with the connection information (e.g., 5G SideLink connection information, URL). The supervisory device receives the broadcasting, by each XR device, of the position data and connection information (e.g., 5G SideLink connection information, URL) over the communication network, the broadcasting occurring continuously, occasionally, periodically, every 5 to 10 seconds, every 10 to 60 seconds, or every one to two minutes. Additionally or alternatively, the supervisory device may be in communication with one of the plurality of XR devices via a direct device-to-device communication based on various technologies, such as Bluetooth or 5G SideLink. The bandwidth and latency limitations inherent to Bluetooth technology may affect the resolution of the stream presented on the supervisory device, such that the stream resolution may be deemed less desirable by the moderator. But the 5G SideLink-based direct device-to-device communication provides low latency and high bandwidth. To access a replica stream relating to a selected XR device, the supervisory device makes a request directly to the selected XR device, the request containing, for example, the position data and/or the 5G Sidelink connection information, of the selected XR device. The supervisory device connects, to the selected XR device, using the 5G SideLink connection information. In this case, the moderator's device may connect to a single XR device at a time, and thus to present one replica stream at a time.

The point of determining the position data of each XR devices in real time is to use those position data (e.g., spatial coordinates) to identify each XR device of the plurality of XR devices, opening up the possibility to distinguish between XR devices of the plurality of XR devices and to select any one of the plurality of XR devices based on the position data of the plurality of XR devices. Additionally, each XR device of the plurality of XR devices may broadcast (continuously, occasionally, periodically, every 5 to 10 seconds, every 10 to 60 seconds or every one to two minutes) their spatial coordinates along with a connection information (e.g., URL, 5G SideLink connection information) to receive a receive a replica stream. The supervisory device may read the URLs of the plurality of XR devices to access the respective replica streams or connect to a specific XR device via device-to-device communication using the related 5G SideLink connection information. The position data of each XR device of the plurality of XR devices may be determined based on various technologies mentioned below.

In some examples, the supervisory device and the plurality of XR devices may be located in the same zone such that the supervisory device equipped with sensors is able to detect the presence of the plurality of XR devices and to locate them in the vicinity of the supervisory device. For instance, the supervisory device may comprise a LIDAR (Light Detection And Ranging) component: the LIDAR component would accommodate a laser source able to emit and scan laser pulses across the surface of objects surrounding the supervisory device (e.g., the plurality of XR devices) and retrieve the laser pulses reflected by the surrounding objects so as to measure distances between the supervisory device and those surrounding objects. Therefore, the supervisory device is able to locate the detected XR devices using the supervisory device as a reference point (whose location may be unknown to the supervisory device). Locating the detected XR devices may utilize image recognition and ways to measure distances.

Additionally or alternatively, each XR device of the plurality of XR devices may comprise a Radio Frequency IDentification (RFID) tag and the supervisory device may comprise a RFID reader in order to determine the position data of each XR device in real time.

Additionally or alternatively, each XR device of the plurality of XR devices may comprise an Inertial Measurement Unit (IMU) comprising two accelerometers and two gyroscopes if the plurality of XR devices are located on the same plane, or three accelerometers and three gyroscopes if the plurality of XR devices are placed on different planes (e.g., at different heights). Each IMU allows for generating motion-related data useful for tracking each XR device.

Additionally or alternatively, each XR device of the plurality of XR devices may comprise a Visual Inertial Odometry (VIO) component, each VIO component comprising a camera and an IMU. The VIO component combines inertial measurements from the IMU with the pose of each XR device from camera images so as to generate motion-related data useful for tracking each XR device.

Additionally or alternatively, (following the technology employed in Air Tags®) each XR device of the plurality of XR devices may emit a Bluetooth or ultra-wideband signal to a cloud-based system accessible by the supervisory device in order for the supervisory device to obtain the position data of the plurality of XR devices.

Additionally, some of the aforementioned technologies may be supplemented by SLAM (Simultaneous Localization And Mapping) technology that uses algorithms to generate maps using topological data acquired by sensors. For instance, LIDAR data of the supervisory device, IMU data and camera-generated video data of the plurality of XR devices may be used by SLAM algorithms to build a map representing the real-time locations of the plurality of XR devices.

Additionally or alternatively, each XR device of the plurality of XR devices may be confined to an area (whose location is known) e.g., surrounded by soft fences in order for the XR device users to safely operate in the area and avoid collisions between the XR device users. This setup is especially useful if the XR device employed is a VR display wherein the XR device user is unable to perceive the surrounding real scene.

In some examples, the supervisory device may be able to present at least one replica stream of the plurality of replica streams, each replica stream representing what a XR device of the plurality of XR devices is currently rendering. If there are multiple replica streams to be presented, the supervisory device may present one of the multiple replica streams, several of the multiple replica streams at the same time, several of them sequentially, all of the multiple replica streams at the same time or all of the multiple replica streams sequentially.

In some examples, the supervisory device may comprise a phone, a tablet, a XR device, a laptop, a computer or the like. The term 'presented via the device' is to be interpreted according to the nature of the supervisory device employed. For instance, if the supervisory device were to be a phone, tablet, laptop, computer or VR display, the supervisory device would comprise a display to present, to the moderator, e.g., at least one stream, a map, a set of images (captured by a camera integrated in the supervisory device) or a combination thereof. If the supervisory device were to be an AR display, the supervisory device would comprise a light engine able to produce an output pupil image (comprising e.g., at least one stream, a map or a combination thereof) and a see-through waveguide to perceive the moderator's immediate environment and replicate the output pupil image (of the light engine) across an eyebox in order for one of those replicated output pupil images to reach the moderator's retina. Alternatively, a small movable mirror could be used to steer the output pupil image from the projector towards the moderator's retina (which would utilize a retina tracker). The proportion of the display or the output pupil image occupied by a stream and the resolution of the stream dictate the level of details of the stream that is accessible by the moderator.

In some examples, the XR devices of the plurality of XR devices may be identical or different to each other, in terms of design and working principle. The supervisory device may present a replica stream representing what a XR device is currently rendering, irrespective of the type of the XR device.

According to some implementations, position data of the supervisory device are determined. In addition, the position of a particular XR device is based at least in part on the position data of the particular XR device relative to the position data of the supervisory device.

In some examples, the supervisory device may be used as a pointer to conveniently and effectively target and thus select any one of the plurality of XR devices so as to present the replica stream relating to the selected XR device. Knowing the spatial coordinates of the plurality of XR devices and the spatial coordinates and orientation (or tilt) of the supervisory device, it is possible to determine whether the extrapolation of the orientation (or tilt) of the supervisory device intersects any one of the plurality of XR devices (or any user wearing a XR device of the plurality of XR devices), and to identify which XR device of the plurality of XR devices (or which user wearing a XR device of the plurality of XR devices) is targeted by the moderator who controls the position data (e.g., position, orientation) of the supervisory device. This allows the moderator to select a XR device in a very convenient manner and to have the replica stream relating to the selected XR device presented, via the supervisory device, to the moderator.

In some examples, the supervisory device may comprise an Inertial Measurement Unit (IMU) comprising two accelerometers and two gyroscopes if the supervisory device and the plurality of XR devices are located on the same plane, or three accelerometers and three gyroscopes if the supervisory device and the plurality of XR devices are placed on different planes (e.g., at different heights). Each IMU allows for generating motion-related data useful for tracking the supervisory device and determining the position data of the supervisory device.

Additionally or alternatively, the supervisory device may comprise a Visual Inertial Odometry (VIO) component comprising a camera and an IMU. The VIO component combines inertial measurements from the IMU with the pose of the supervisory device from camera images so as to generate motion-related data useful for tracking the supervisory device.

Additionally or alternatively, (following the technology employed in Air Tags®) the supervisory device may emit a Bluetooth or ultra-wideband signal to a cloud-based system accessible by the supervisory device in order for the supervisory device to obtain the position data of the supervisory device.

Additionally, some of the aforementioned technologies may be supplemented by SLAM (Simultaneous Localization And Mapping) technology that uses algorithms to generate maps using topological data acquired by sensors. For instance, IMU data and camera-generated video data of the supervisory device may be used by SLAM algorithms to build a map representing the position of the supervisory device.

According to some implementations, generating the replica stream for display comprises generating for display a view from a viewpoint of the selected XR device augmented with one or more visual elements generated by the selected XR device.

The supervisory device is able to present in real-time, to the moderator, what the user of the selected XR device views, including any visual elements generated by the XR device itself. This allows the moderator to have full knowledge of the what the XR device user is consuming in real-time and to perform any of the aforementioned tasks.

According to some implementations, position data of the supervisory device are determined. Additionally, the supervisory device is operated to generate for display, based on the position data of each XR device and the supervisory device, a map display representing a location of each XR device and a location of the supervisory device. Furthermore, receiving the selection of the position of an XR device further comprises receiving a selection of a representation of the location of the XR device on the map display.

The supervisory device may use the position data of each XR device of the plurality of XR devices and the position data of the supervisory device to build an accurate map representing the locations (e.g., real-time locations) of the plurality of XR devices and the location of the supervisory device, respectively. For instance, the map may be generated by feeding LIDAR data, IMU data and camera-generated video data to SLAM algorithms. The map may be a plan view of the spatial arrangement of the plurality of XR devices and the supervisory device. The moderator is then able to identify each XR device of the plurality of XR devices more easily than if they had to directly look at the spatial arrangement of the plurality of XR devices and the supervisory device.

According to some implementations, the supervisory device is operated to additionally generate for display in association with a representation of an XR device on the map display, the replica stream of the XR device.

Hereby, the supervisory device is able to present, to the moderator, a replica stream in a dedicated portion of a map, using for instance Picture-in-Picture (PiP). This makes the selection of an XR device easier.

In this way, it is possible to obtain a map representing the locations (e.g., real-time locations) of the supervisory device, and the locations (e.g., real-time locations) of the plurality of XR devices accompanied each by a small floating window presenting the respective stream mapped to the XR device located adjacent to the small floating window. For instance, the map may be generated by feeding LIDAR data, IMU data and camera-generated video data to SLAM algorithms. This is of great interest for the moderator who has to simultaneously monitor multiple streams as they can have an overview of all the available streams, which makes the selection by the moderator easier to perform. By selecting one of the small floating windows, only the stream mapped to the XR device located next to the small floating window is presented, via the apparatus, to the moderator, which allows for the consumption, by the moderator, of the stream at a level of details higher than if the stream were to be confined to a small floating window. Additionally or alternatively, the selection may be done by selecting one XR device user represented on the map.

According to some implementations, an image of the environment perceived by the supervisory device is generated for display. Additionally, each XR device present in the image of the perceived environment is detected. Furthermore, each detected XR device in the image of the perceived environment is identified based on position data of each detected XR device. Moreover, an overlay representing the replica stream of the identified XR device in association with the XR device as shown in the image of the perceived environment is generated for display, for each identified XR device.

In some examples, the supervisory device may have at least one sensor (e.g., a camera, a LIDAR component) able to detect the presence of XR devices in the field of view of the sensor. The supervisory device may then assess the real-time location of each detected XR device in the field of view of the sensor (knowing the position data of the supervisory device) and cross-reference the position of each detected XR device in the field of view of the sensor with the position data of the plurality of the XR devices determined by the above methods so as to identify each detected XR device. For each detected XR device, an overlay of the replica stream relating to the detected XR device is presented next to the detected XR device. The moderator may then select the overlay of their choice so as to have only the stream (presented in the overlay) presented via the apparatus, which allows for the consumption of the stream at a level of details higher than if the stream were to be confined to a small overlay.

The moderator may be also able to switch between multiple replica streams they are to monitor and consume the multiple replica streams at a higher level of details by selecting one of the multiple replica streams.

According to some implementations, the source is a local server, wherein the local server, the supervisory device and the plurality of XR devices are on the same Local Area Network.

In some examples, the plurality of XR devices may broadcast continuously, occasionally, periodically, every 5 to 10 seconds, every 10 to 60 seconds or every one to two minutes the position data (e.g., spatial coordinates) and connection information (e.g., URL) over a first communication network to which is connected the supervisory device. Once a connection is requested by the supervisory device, the selected XR device will start an audio encoder encoding the audio and a video encoder encoding the XR device viewport. The encoded video and audio will be multiplexed and transmitted over the LAN via RTP (Real-time Transport Protocol) to the network address: port (e.g., URL) of a first server relating to the selected XR device. The supervisory device then reads the URL relating to the selected XR device in order to find the first server and fetch the replica stream relating to the selected XR device. The replica stream relating to the selected XR device is presented via the supervisory device. The communication between the supervisory device and the plurality of XR devices mediated via a Local Area Network (LAN) offers low latency and high bandwidth compared to the case where the communication between the supervisory device and the plurality of XR devices is implemented via a Wide Area Network.

According to some implementations, the source is a remote server in communication with the supervisory device and the plurality of XR devices via a Wide Area Network.

In some examples, the plurality of XR devices may broadcast continuously, occasionally, periodically, every 5 to 10 seconds, every 10 to 60 seconds or every one to two minutes the position data (e.g., spatial coordinates) and connection information (e.g., URL) over a first communication network to which is connected the supervisory device. Each XR device may transfer a replica stream representing what it is currently rendering, via the first communication network, to a first server belonging to the first communication network (either at all times or on demand due to bandwidth limitations dependent, in part, on the number of XR devices). The supervisory device may then receive the replica stream relating to the selected XR device via the first communication network by making a request to the first server, the request containing, for example, the position data (e.g., spatial coordinates) and/or the connection information (e.g., URL) of the selected XR. The first communication network and the first server may be a WAN and a remote server, respectively.

According to some implementations, the supervisory device and the plurality of XR devices are on the same Local Area Network, when the source is a remote server in communication with the supervisory device and the plurality of XR devices via a Wide Area network.

In some examples, the plurality of XR devices may broadcast continuously, occasionally, periodically, every 5 to 10 seconds, every 10 to 60 seconds or every one to two minutes the position data (e.g., spatial coordinates) and connection information (e.g., URL) over a first communication network to which are connected the supervisory device and a first server. Each XR device may transfer a replica stream representing what it is currently rendering, via a second communication network different from the first communication network, to a second server connected to the second communication network; the supervisory device may then receive the replica stream relating to the selected XR device via the second communication network by making a request to the second server, the request containing, for instance, the position data (e.g., spatial coordinates) and/or the second communication network-related connection information (e.g., URL) of the selected XR device. In this configuration, the first and second communication networks are a LAN and a WAN, respectively and the first and second servers are a local server and a remote server.

According to some implementations, the source is the selected XR device and the supervisory device and selected XR device are in direct device-to-device communication with one another In some examples, the plurality of XR devices may broadcast continuously, occasionally, periodically, every 5 to 10 seconds, every 10 to 60 seconds or every one to two minutes the position data (e.g., spatial coordinates) and connection information (e.g., URL, 5G SideLink connection information) over a first communication network to which is connected the supervisory device. The supervisory device may then receive the replica stream relating to the selected XR device by making a request to the selected XR device, the request containing, for instance, the position data (e.g., spatial coordinates) and/or the connection information (e.g., 5G SideLink connection information) of the selected XR device. The direct device-to-device communication allows for low latency and high bandwidth.

In another aspect, the disclosure relates to method for supervising a plurality of users of XR devices. A problem arises in that a supervisor hoping to assist a user in operating in the XR environment cannot easily obtain a representation of the XR environment which a particular user amongst the plurality of users is currently perceiving. This other aspect of the disclosure tackles this problem by having each XR device and a supervisory device independently determine the position of an XR device. Each XR device provides replica stream data in association with its position, and the user of the supervisory device selects an XR device by selecting its position. By tallying the position in the supervisor's selection of an XR device with the position associated with each replica stream, the replica stream of the XR device selected by the supervisor can be provided to the supervisory device.

In some embodiments, the tallying is performed by a third device (e.g., a server) which receives i) the replica stream and the associated position from the XR device, and ii) the position of a selected XR device from the supervisory device. The server may then find the replica stream associated with the position received from the supervisory device and transmit the replica stream to the supervisory device, or may alternatively transmit connection information to the supervisory device indicating a resource (in some examples the server itself) from which the supervisory device can obtain the replica stream.

In other embodiments, the tallying is performed by the XR device. In such embodiments, the supervisory device broadcasts a request for the stream from the XR device at a given position to all the XR devices, and the XR device at the given position responds to the supervisory device with the replica stream or connection information from which the supervisory device can obtain the replica stream.

In yet other embodiments, the tallying is performed by the supervisory device. In such embodiments, each of the XR devices sends its replica stream (or connection information pointing to a resource from which its replica stream can be retrieved) to the supervisory device along with an indication of its position, and the XR device then, if required, obtains the replica stream from the resource, and generates the replica stream for display on the supervisory device.

DETAILED DESCRIPTION

Figure 1:
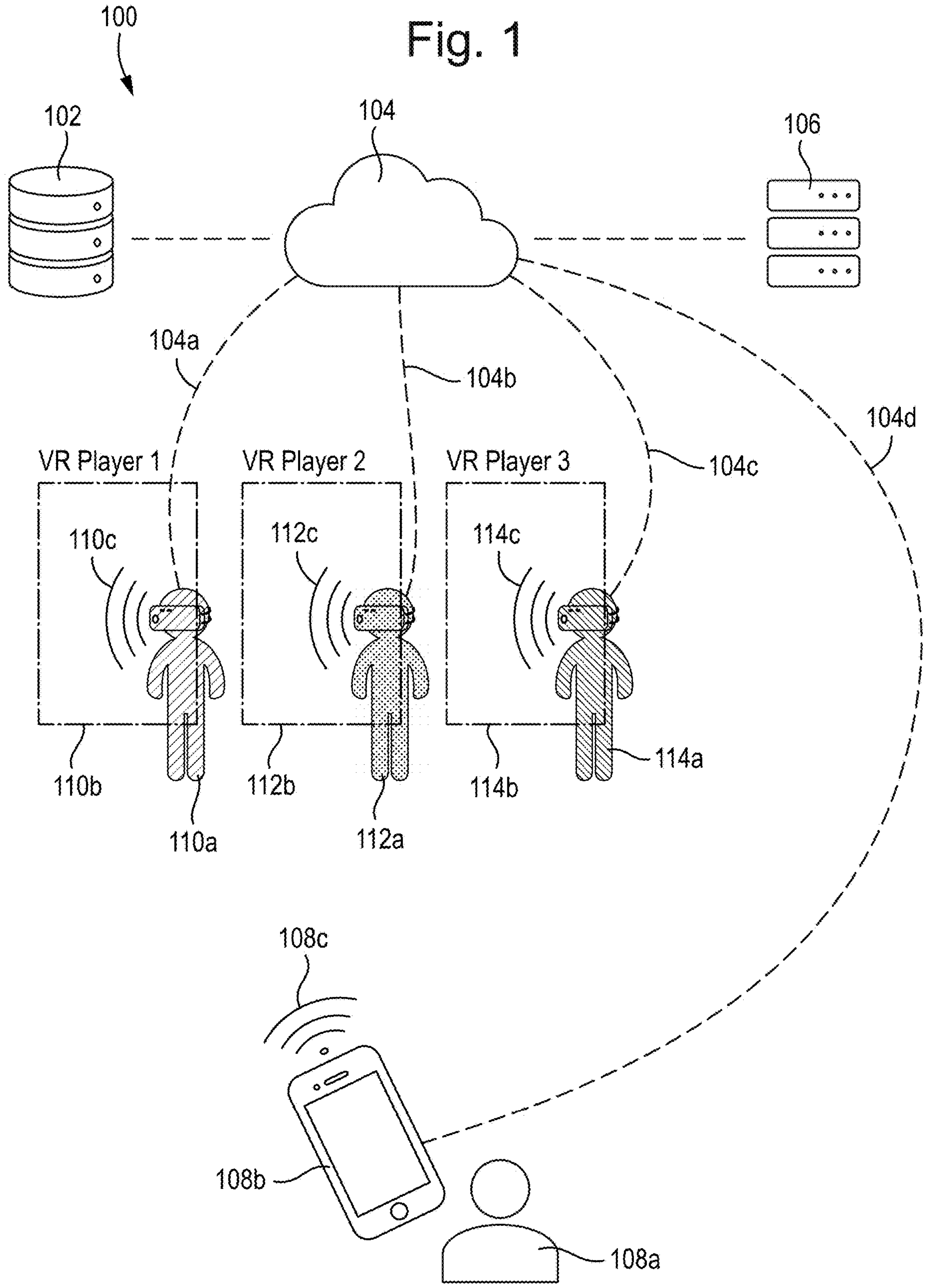
FIG. 1 depicts an overview of a system for accessing multiple replica streams in accordance with some implementations of the disclosure.

Throughout the detailed description, the supervisory device is called the moderator's apparatus. FIG. 1 depicts an overview of a system 100 for accessing multiple replica streams in accordance with some implementations of the disclosure. System 100 comprises a stream database 102, a communication network 104, a server 106, multiple XR devices 110*a*, 112*a* and 114*a* and a moderator's apparatus 108*b*. The moderator's apparatus 108*b* and XR devices 110*a*, 112*a* and 114*a* are all connected to stream database 102 and server 106 through communication network 104. The moderator's apparatus 108*b* may be connected to XR devices 110*a*, 112*a* and 114*a* through communication network 104 (e.g., Wi-Fi, wireless such as 5G, 6G). Additionally or alternatively, the moderator's apparatus 108*b* may be connected to one of the plurality of XR devices (XR devices 110*a*, 112*a* or 114*a*) through direct device-to-device communication depicted by one duplet (duplet 108*c*/110*c*, 108*c*/112*c* or 108*c*/114*c*), one XR device at a time. The numerals 108*c*, and 110*c*, 112*c* and 114*c* designate the direct device-to-device communication enabling components in the moderator's apparatus 108*b* and the XR devices 110*a*, 112*a* and 114*a*, respectively. Direct device-to-device communication may be implemented via Bluetooth pairing or 5G SideLink, for example. In FIG. 1, the moderator's apparatus 108*b* may be a mobile phone that comprises a display, at least one camera able to capture the surrounding environment, and an IMU. However, other types of moderator's apparatus may be used in the situation depicted in FIG. 1: the moderator's apparatus 108*b* may comprise a phone, a tablet, a XR device, a laptop, a computer or any combination thereof. The spatial coordinates and orientation (or tilt) of moderator's apparatus 108*b* may be determined using various technologies, such as those discussed herein (e.g., IMU, VIO, Bluetooth).

Each XR device and each related XR device user are represented by the same numeral. Accordingly, XR device user 110*a* consumes stream 110*b* rendered by XR device 110*a*. Similarly, XR device user 112*a* consumes stream 112*b* rendered by XR device 112*a*. Similarly, XR device user 114*a* consumes stream 114*b* rendered by XR device 114*a*. The spatial coordinates of XR devices 110*a*, 112*a* and 114*a* may be determined using various technologies discussed herein, such as LIDAR, RFID, IMU, VIO, Bluetooth. Additionally, for instance, LIDAR data, IMU data and camera-generated video data of the moderator's apparatus 108*b* and IMU data and camera-generated video data of XR devices 110*a*, 112*a* and 114*a* (if XR devices are equipped with VIO technology) may be used by SLAM algorithms to build a map representing the real-time locations of the moderator's apparatus and the plurality of XR devices. The position data (e.g., real-time spatial coordinates) and/or the connection information (e.g., URL, 5G SideLink connection information) of the plurality of the XR devices and the real-time position data moderator's apparatus (e.g., spatial coordinates, orientation or tilt of the moderator's apparatus) may be continuously broadcast over communication network 104. The position data of the plurality of XR devices and the moderator's apparatus may be fed to SLAM algorithms so as to build a real-time map representing the real-time locations of the plurality of XR devices and the moderator's apparatus. The SLAM algorithms are run in a SLAM system shared by the plurality of XR devices and the moderator's apparatus.

In a first scenario, communication network 104 and server 106 may be a WAN and a remote server, respectively. Each XR device (e.g. XR device 110*a*, 112*a* or 114*a*) may continuously broadcast, over communication network 104, position data and connection information (e.g., URL). The moderator's apparatus 108*b* may receive the continuous broadcasting, by each XR device, of the position data and connection information (e.g., URL), over communication network 104. Each stream (e.g., stream 110*b*, 112*b* or 114*b*) rendered by a XR device (e.g., XR device 110*a*, 112*a* or 114*a*) is transferred, via communication network 104, to server 106, either all the time or on demand (due to bandwidth limitations dictated by the number of XR devices) using the moderator's apparatus 108*b*. Each stream (e.g., stream 110*b*, 112*b* or 114*b*) may be stored in the stream database 102 connected to server 106. The moderator's apparatus 108*b* may select a XR device (e.g., XR device 110*a*, 112*a* or 114*a*) using the position data to identify the selected XR device. The moderator's apparatus 108*b* may make a request, via communication network 104, to server 106 so as to access the replica stream relating to the selected XR device: the request may comprise the position data and connection information (e.g., URL) of the selected XR device. The moderator's apparatus 108*b* then connects to the URL of the selected XR device and the stream (e.g., stream 110*b*, 112*b* or 114*b*) rendered by the selected XR device (e.g., XR device 110*a*, 112*a* or 114*a*) is presented via the moderator's apparatus 108*b*. In this manner, the moderator's apparatus 108*b* may simultaneously seamlessly access and simultaneously present multiple replica streams (e.g., 110*b*, 112*b* and 114*b*), or present at least one of the multiple replica streams (e.g., stream 110*b*, 112*b* or 114*b*). By simply allowing each XR device to share the stream (each XR device renders) with a server and encoder, the consumption is detached from any connectivity hassle with any one of the plurality of XR devices.

In a second scenario, communication network 104 and server 106 may be a LAN and a local server, respectively. Each XR device (e.g. XR device 110*a*, 112*a* or 114*a*) may continuously broadcast, over communication network 104, position data and connection information (e.g., URL). The moderator's apparatus 108*b* may receive the continuous broadcasting, by each XR device, of the position data and connection information (e.g., URL), over communication network 104. The moderator's apparatus 108*b* may select a XR device (e.g., XR device 110*a*, 112*a* or 114*a*) using the position data to identify the selected XR device. The moderator's apparatus 108*b* may make a request, via communication network 104, to server 106 so as to access the replica stream relating to the selected XR device: the request may comprise the position data and connection information (e.g., URL) of the selected XR device. Once a connection is requested by the moderator's apparatus, the selected XR device will start an audio encoder encoding the audio and a video encoder encoding the XR device viewport. The encoded video and audio will be multiplexed and transmitted over the LAN via RTP (Real-time Transport Protocol) to the network address: port (e.g., URL) relating to the selected XR device. The transmission can leverage any low latency protocol and RTP is an example. WebRTC and SCReAM2 are examples leveraging self-clocked rate adaptation allowing for video encoder bit rate modifications based on changing network QoS conditions. The moderator's apparatus 108*b* then connects to the URL of the selected XR device and the stream (e.g., stream 110*b*, 112*b* or 114*b*) rendered by the selected XR device (e.g., XR device 110*a*, 112*a* or 114*a*) is presented via the moderator's apparatus 108*b*. In this manner, the moderator's apparatus 108*b* may simultaneously seamlessly access and simultaneously present multiple replica streams (e.g., 110*b*, 112*b* and 114*b*), or present at least one of the multiple replica streams (e.g., stream 110*b*, 112*b* or 114*b*).

In a third scenario, communication network 104 is indeed two distinct communication networks, a LAN and a WAN, and server 106 is indeed two distinct servers, a local server and a remote server, the local server and the remote server belonging to the LAN and the WAN, respectively. Each XR device (e.g. XR device 110*a*, 112*a* or 114*a*) may continuously broadcast, over the LAN, position data and connection information (e.g., URL). The moderator's apparatus 108*b* may receive the continuous broadcasting, by each XR device, of the position data and connection information (e.g., URL), over the LAN. Each stream (e.g., stream 110*b*, 112*b* or 114*b*) rendered by a XR device (e.g., XR device 110*a*, 112*a* or 114*a*) is transferred, via the WAN, to the remote server, either all the time or on demand (due to bandwidth limitations dictated by the number of XR devices) using the moderator's apparatus 108*b*. Each stream (e.g., stream 110*b*, 112*b* or 114*b*) may be stored in the stream database 102 connected to server 106. The moderator's apparatus 108*b* may select a XR device (e.g., XR device 110*a*, 112*a* or 114*a*) using the position data to identify the selected XR device. The moderator's apparatus 108*b* may make a request, via the WAN, to the remote server so as to access the stream mapped to the selected XR device: the request may comprise the position data and connection information (e.g., URL) of the selected XR device. The moderator's apparatus 108*b* then connects to the URL of the selected XR device and the stream (e.g., stream 110*b*, 112*b* or 114*b*) rendered by the selected XR device (e.g., XR device 110*a*, 112*a* or 114*a*) is presented via the moderator's apparatus 108*b*. In this manner, the moderator's apparatus 108*b* may simultaneously seamlessly access and simultaneously present multiple replica streams (e.g., 110*b*, 112*b* and 114*b*), or present at least one of the multiple replica streams (e.g., stream 110*b*, 112*b* or 114*b*).

In a fourth scenario, communication network 104 and server 106 may be a LAN and a local server, respectively or a WAN and a remote server, respectively. Each XR device (e.g. XR device 110*a*, 112*a* or 114*a*) may continuously broadcast, over communication network 104, position data and connection information (e.g., URL, 5G SideLink connection information). The moderator's apparatus 108*b* may receive the continuous broadcasting, by each XR device, of the position data and 5G Sidelink connection information, over communication network 104. The moderator's apparatus 108*b* may select a XR device (e.g., XR device 110*a*, 112*a* or 114*a*) using the position data to identify the selected device. To access a stream (e.g., stream 110*b*, 112*b* or 114*b*) mapped to a selected XR device (e.g., XR device 110*a*, 112*a* or 114*a*), the moderator's apparatus may make a request, via 5G SideLink connection (e.g., duplet 108*c*/110*c*, 108*c*/112*c* or 108*c*/114*c*), to the selected XR device (e.g., XR device 110*a*, 112*a* or 114*a*) so as to access the replica stream relating to the selected XR device, the request may comprise the position data and 5G SideLink connection information of the selected XR device. In the frame of direct device-to-device communication, the moderator's device 108*b* connects to the selected XR device (e.g., XR device 110*a*, 112*a* or 114*a*), using the 5G Sidelink connection information: a two-way communication path will be established allowing for both near real-time viewing and interaction between the devices. In this manner, the moderator's device 108*b* may seamlessly connect to an XR device (e.g., XR device 110*a*, 112*a* or 114*a*), and present the replica stream (e.g., stream 110*b*, 112*b* or 114*b*).

A stream (e.g., streams 110*b*, 112*b* or 114*b*), selected by moderator 108*a* via the moderator's apparatus 108*b*, may be presented on the full display of the moderator's apparatus 108*b*. The selection of the replica stream to be presented may be implemented following different approaches exemplified in FIGS. 2 to 6 and 7 to 11.

Figure 2:
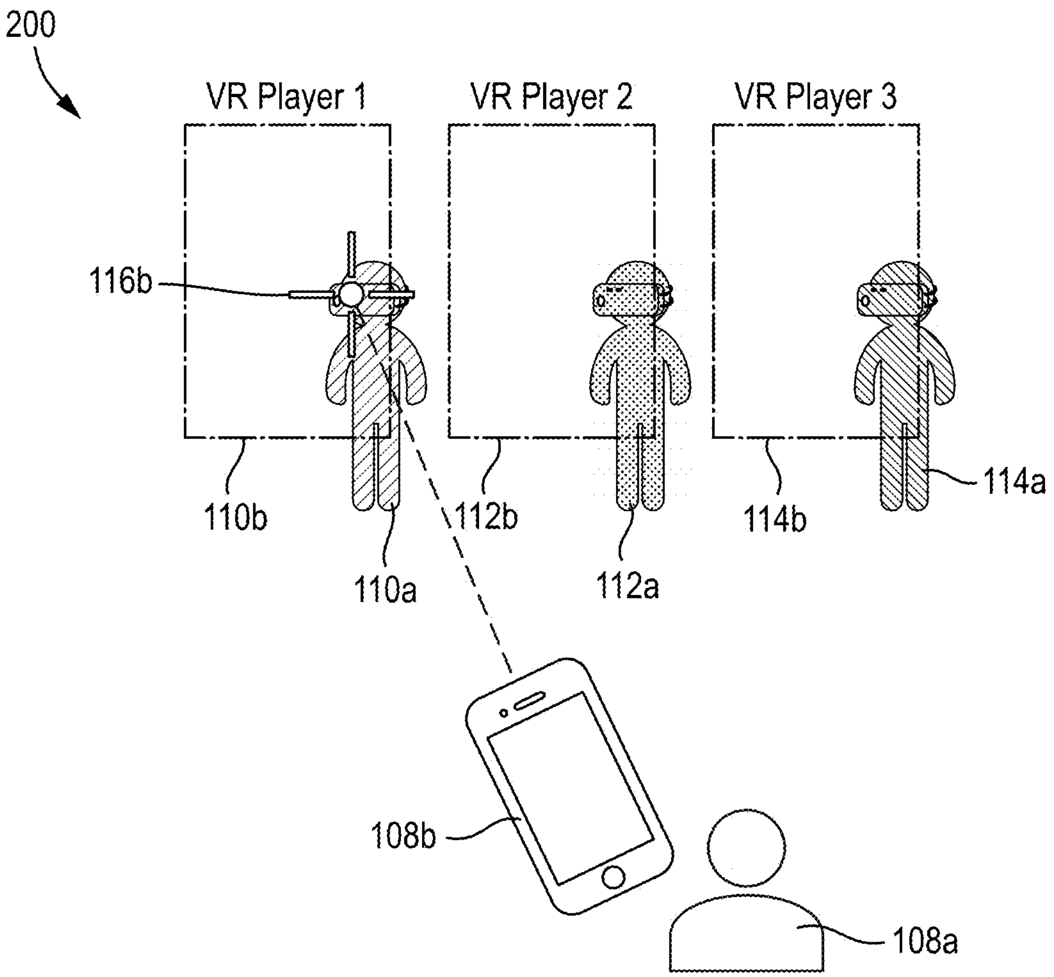
FIG. 2 illustrates an overview of a system for accessing multiple replica streams in accordance with some implementations of the disclosure.

FIG. 2 illustrates an overview of a system 200 for accessing multiple replica streams in accordance with some implementations of the disclosure. FIG. 2 represents the same system as that of FIG. 1. The scenarios described above in relation to FIG. 1 may also apply to FIG. 2. For the sake of clarity, stream database 102, communication network 104, server 106, components 110*c*, 112*c*, 114*c* and 108*c* enabling direct device-to-device communication between the moderator's apparatus 108*b* and XR devices 110*a*, 112*a* and 114*a* are not shown in FIG. 2. In FIG. 2, the moderator's apparatus 108*b* may be a mobile phone that comprises a display, at least one camera able to capture the surrounding environment and an IMU. However, other types of moderator's apparatus may be used in the situation depicted in FIG. 2: the moderator's apparatus 108*b* may comprise a phone, a tablet, a XR device, a laptop, a computer or any combination thereof, as long as it has a display, at least one camera able to capture the surrounding environment and an IMU.

The spatial coordinates of XR devices 110*a*, 112*a* and 114*a* may be determined using various technologies discussed herein, e.g., LIDAR, RFID, IMU, VIO, Bluetooth.

The spatial coordinates and orientation (or tilt) of moderator's apparatus 108*b* may be determined using various technologies discussed herein, e.g., IMU, VIO, Bluetooth. Additionally, for instance, LIDAR data (if the moderator's device is equipped with a LIDAR component), IMU data and camera-generated video data of the moderator's device 108*b* and IMU data and camera-generated video data of XR devices 110*a*, 112*a* and 114*a* (if XR devices are equipped with VIO technology) may be used by SLAM algorithms to build a map representing the real-time locations of the moderator's apparatus and the plurality of XR devices. Knowing the spatial coordinates of XR devices 110*a*, 112*a* and 114*a*, and the spatial coordinates and orientation (or tilt) of the moderator's apparatus 108*b*, it is possible to determine whether the extrapolation of the orientation (or tilt) of the moderator's apparatus 108*b* is to intersect one of the available XR device (user) 110*a*, 112*a* or 114*a*. In FIG. 2, moderator 108*a* points the moderator's apparatus 108*b* towards XR device 110*a* in order to select XR device 110*a*. A trajectory 116*a* and a related aiming cross 116*b* are drawn to materialize the selection of XR device 110*a*. When moderator 108*a* points the moderator's apparatus 108*b* at XR device (user) 110*a*, the moderator's apparatus 108*b* makes a request to a server or the selected XR device, depending on the scenario considered (e.g., first, second, third or fourth scenario), to access stream 110*b*. The selection of XR device 110*a* results in having the stream 110*b* (mapped to XR device 110*a*) presented on the full display of the moderator's apparatus 108*b*, allowing moderator 108*a* to access a higher level of details for a better understanding of what XR device user 110*a* consumes.

Figure 3:
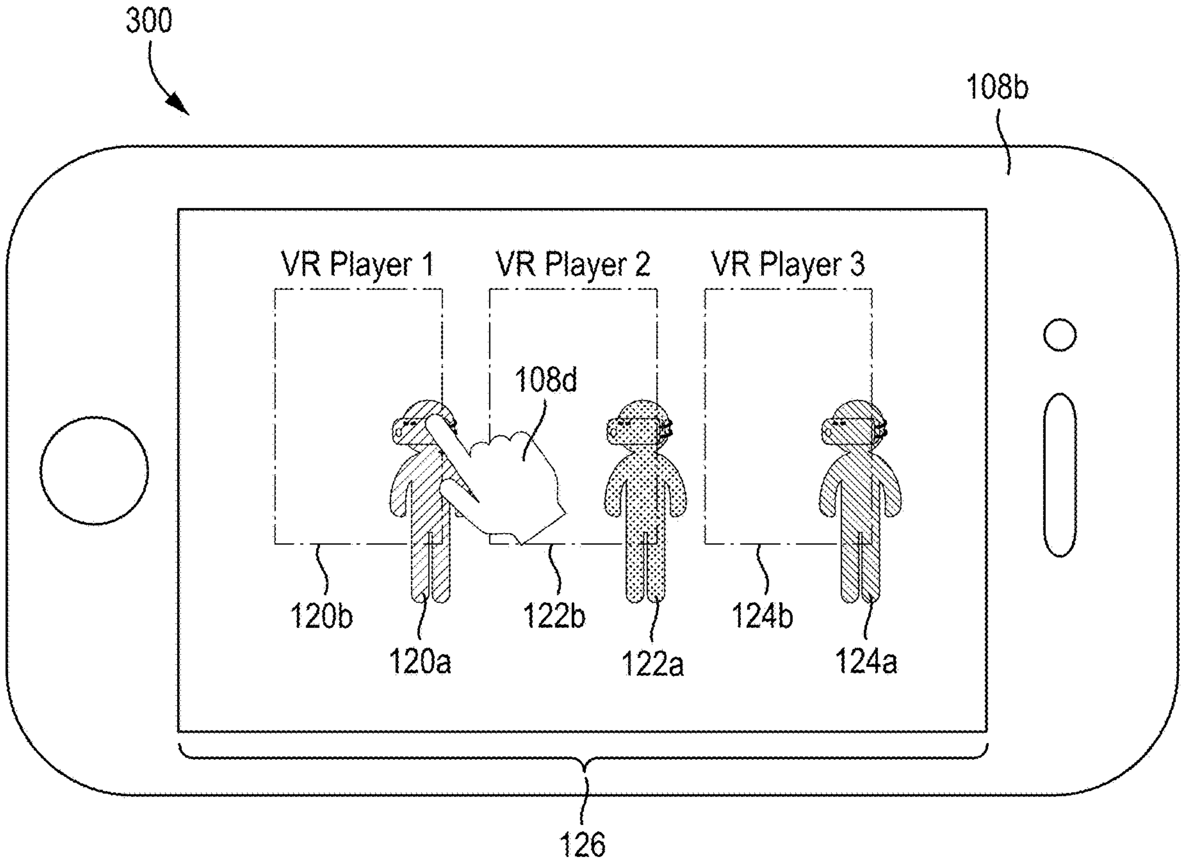
FIG. 3 represents an overview of a display of a moderator's apparatus, part of a system for accessing multiple replica streams in accordance with some implementations of the disclosure.

FIG. 3 represents an overview 300 of a display of a moderator's apparatus 108*b*, part of a system for accessing multiple replica streams in accordance with some implementations of the disclosure. The system in question is the same as those of FIGS. 1 and 2. The scenarios described in relation to FIG. 1 may also apply to FIG. 3. For the sake of clarity, stream database 102, communication network 104, server 106, components 110*c*, 112*c*, 114*c* and 108*c* enabling direct device-to-device communication between the moderator's apparatus 108*b* and XR devices 110*a*, 112*a* and 114*a* are not shown in FIG. 3. In FIG. 3, the moderator's apparatus 108*b* is a mobile phone that comprises a display, at least one camera able to capture the surrounding environment and an IMU. However, other types of moderator's apparatus may be used in the situation depicted in FIG. 3: the moderator's apparatus 108*b* may comprise a phone, a tablet, a XR device, a laptop, a computer or any combination thereof, as long as it has a display, at least one camera able to capture the surrounding environment and an IMU.

The spatial coordinates of XR devices 110*a*, 112*a* and 114*a* may be determined using various technologies mentioned earlier e.g., LIDAR, RFID, IMU, VIO, Bluetooth. The spatial coordinates and orientation (or tilt) of moderator's apparatus 108*b* may be determined using various technologies mentioned earlier e.g., IMU, VIO, Bluetooth. Additionally, for instance, LIDAR data, IMU data and camera-generated video data of the moderator's device 108*b* and IMU data and camera-generated video data of XR devices 110*a*, 112*a* and 114*a* (if XR devices are equipped with VIO technology) may be used by SLAM algorithms to build a map representing the real-time locations of the moderator's apparatus and the plurality of XR devices.

The display of moderator's apparatus 108*b* shows an image 126 representing the camera-captured scene, i.e., what moderator 108*a* would see on the display of the moderator's apparatus 108*b*, if moderator 108*a* were to capture the scene in front of them using the camera of the moderator's apparatus 108*b*. On the display of the moderator's apparatus 108*b*, XR device users 110*a*, 112*a* and 114*a* are depicted as XR device user representations 120*a*, 122*a* and 124*a*, respectively. Overlay 120*b* of stream 110*b*, overlay 122*b* of stream 112*b* and overlay 124*b* of stream 114*b* are superimposed on respective portions of image 126 and placed close to XR device user representations 120*a*, 122*a* and 124*a*, respectively. Streams 110*b*, 112*b* and 114*b* are simultaneously presented within overlays 120*b*, 122*b* and 124*b*, respectively. Using cursor 108*d*, the moderator 108*a* (not shown here) selects XR device user representation 120*a* or overlay 120*b* so as to present stream 110*b* (mapped to XR device 110*a*) on the full display of the moderator's apparatus 108*b*, allowing moderator 108*a* to access a higher level of details for a better understanding of what XR device user 110*a* consumes. Having overlays 120*b*, 122*b* and 124*b* within the image of the camera-captured scene, in the vicinity of XR device user representations 130*a*, 132*a* and 134*a*, respectively allows moderator 108*a* to have a clear overview of which XR device user is watching which stream and to visually diagnose the status of each XR device user in real time.

Figure 4:
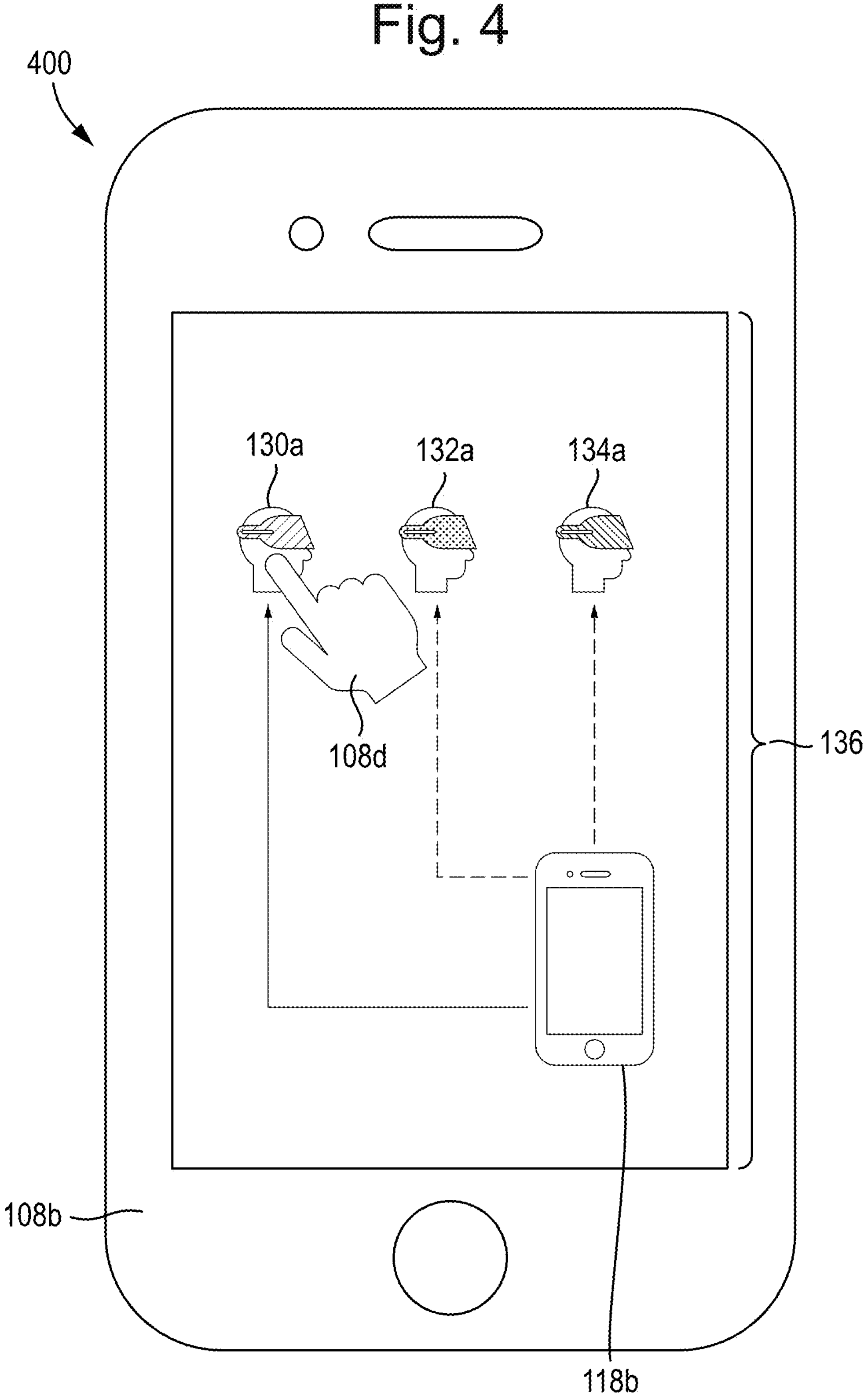
FIG. 4 shows an overview of a display of a moderator's apparatus, part of a system for accessing multiple replica streams in accordance with some implementations of the disclosure.

FIG. 4 shows an overview 400 of a display of a moderator's apparatus 108*b*, part of a system for accessing multiple replica streams in accordance with some implementations of the disclosure. The system in question is the same as those of FIGS. 1 to 3. The first, second, third or fourth scenario of FIG. 1 may apply to FIG. 4. For the sake of clarity, stream database 102, communication network 104, server 106, components 110*c*, 112*c*, 114*c* and 108*c* enabling direct device-to-device communication between the moderator's apparatus 108*b* and XR devices 110*a*, 112*a* and 114*a* are not shown in FIG. 4. In FIG. 4, the moderator's apparatus 108*b* is a mobile phone that comprises a display, at least one camera able to capture the surrounding environment and an IMU. However, other types of moderator's apparatus may be used in the situation depicted in FIG. 4: the moderator's apparatus 108*b* may comprise a phone, a tablet, a XR device, a laptop, a computer or any combination thereof, as long as it has a display, at least one camera able to capture the surrounding environment and an IMU.

The spatial coordinates of XR devices 110*a*, 112*a* and 114*a* may be determined using various technologies mentioned earlier e.g., LIDAR, RFID, IMU, VIO, Bluetooth. The spatial coordinates and orientation (or tilt) of the moderator's apparatus 108*b* may be determined using various technologies mentioned earlier (e.g., IMU, VIO, Bluetooth). Additionally, for instance, LIDAR data, IMU data and camera-generated video data of the moderator's device 108*b* and IMU data and camera-generated video data of XR devices 110*a*, 112*a* and 114*a* (if XR devices are equipped with VIO technology) may be used by SLAM algorithms to build a map representing the real-time locations of the moderator's apparatus and the plurality of XR devices.

In FIG. 4, the display of the moderator's apparatus 108*b* represents a map 136 representing the real-time locations of each XR device (user) 110*a*, 112*a* and 114*a* and moderator's apparatus 108*b*. In map 136, XR device users 110*a*, 112*a* and 114*a* are depicted as XR device user representations 130*a*, 132*a* and 134*a*, respectively and moderator 108*a* is represented as the moderator representation 118*b*. Using cursor 108*d*, moderator 108*a* (not shown here) selects XR device user representation 130*a* so as to present stream 110*b* (mapped to XR device 110*a*) on the full display of the moderator's apparatus 108*b*, allowing moderator 108*a* to access a higher level of details for a better understanding of what XR device user 110*a* consumes.

Figure 5:
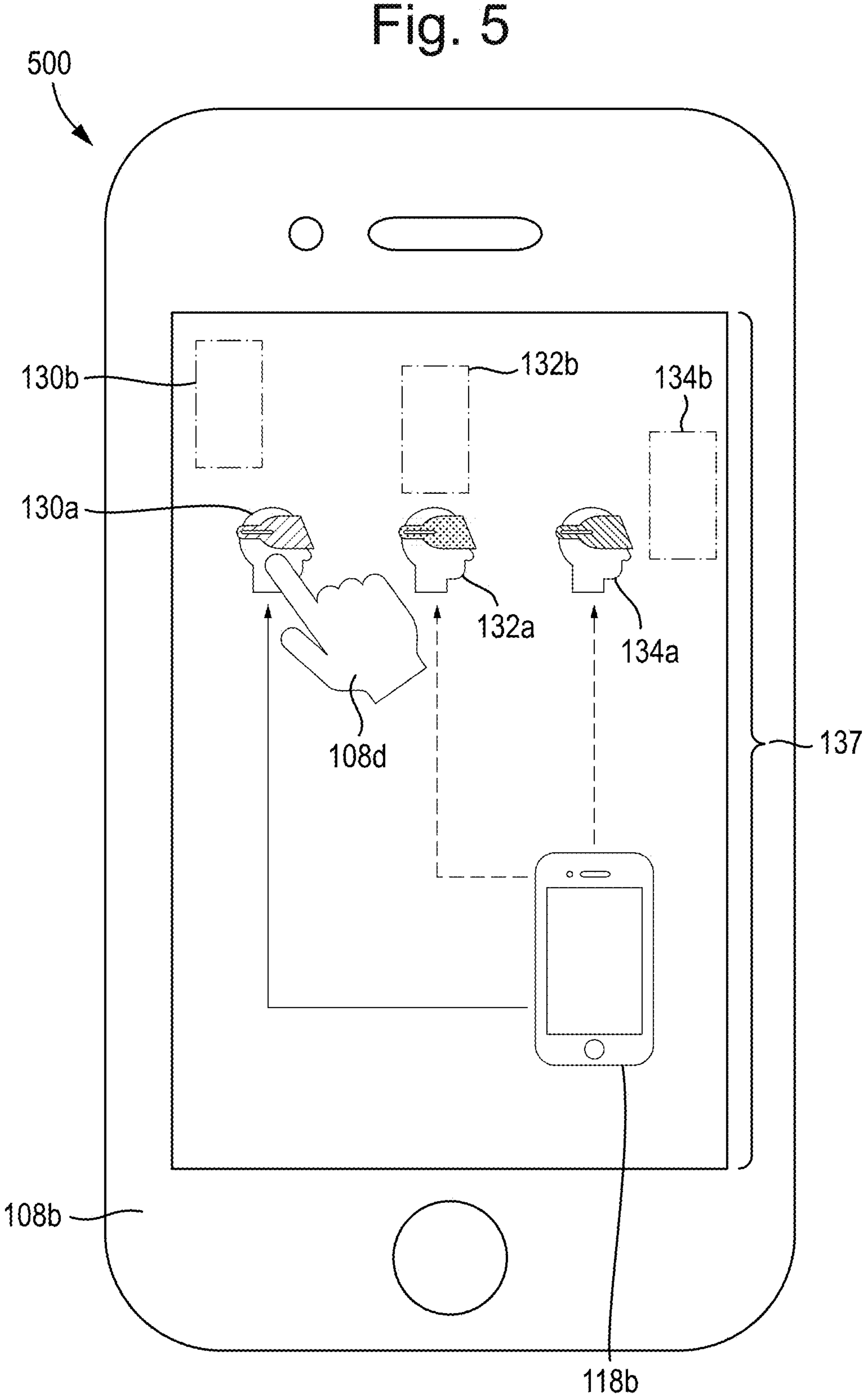
FIG. 5 depicts an overview of a display of a moderator's apparatus, part of a system for accessing multiple replica streams in accordance with some implementations of the disclosure.

FIG. 5 depicts an overview 500 of a display of a moderator's apparatus 108*b*, part of a system for accessing multiple replica streams in accordance with some implementations of the disclosure. The system in question is the same as those of FIGS. 1 to 4. The first, second, third or fourth scenario of FIG. 1 may apply to FIG. 5. For the sake of clarity, stream database 102, communication network 104, server 106, components 110*c*, 112*c*, 114*c* and 108*c* enabling direct device-to-device communication between the moderator's apparatus 108*b* and XR devices 110*a*, 112*a* and 114*a* are not shown in FIG. 5. In FIG. 5, the moderator's apparatus 108*b* is a mobile phone that comprises a display, at least one camera able to capture the surrounding environment and an IMU. However, other types of moderator's apparatus may be used in the situation depicted in FIG. 5: the moderator's apparatus 108*b* may comprise a phone, a tablet, a XR device, a laptop, a computer or any combination thereof, as long as it has a display, at least one camera able to capture the surrounding environment and an IMU.

The spatial coordinates of XR devices 110*a*, 112*a* and 114*a* may be determined using various technologies mentioned earlier e.g., LIDAR, RFID, IMU, VIO, Bluetooth. The spatial coordinates and orientation (or tilt) of the moderator's apparatus 108*b* may be determined using various technologies mentioned earlier (e.g., IMU, VIO, Bluetooth). Additionally, for instance, LIDAR data, IMU data and camera-generated video data of the moderator's device 108*b* and IMU data and camera-generated video data of XR devices 110*a*, 112*a* and 114*a* (if XR devices are equipped with VIO technology) may be used by SLAM algorithms to build a map representing the real-time locations of the moderator's apparatus and the plurality of XR devices.

In FIG. 5, the display of the moderator's apparatus 108*b* represents a map 137 representing the real-time locations of each XR device (user) 110*a*, 112*a* and 114*a* and of the moderator's apparatus 108*b*. In map 137, XR device users 110*a*, 112*a* and 114*a* are depicted as XR device user representations 130*a*, 132*a* and 134*a*, respectively and moderator 108*a* is depicted as the moderator representation 118*b*. Floating windows 130*b*, 132*b* and 134*b* are located within map 137, in the vicinity of XR device user representations 130*a*, 132*a* and 134*a*, respectively. Streams 110*b*, 112*b* and 114*b* are simultaneously presented within floating windows 130*b*, 132*b* and 134*b*, respectively. Using cursor 108*d*, moderator 108*a* (not shown here) selects either XR device user representation 130*a* or floating window 130*b* so as to present stream 110*b* (mapped to XR device 110*a*) on the full display of the moderator's apparatus 108*b*, allowing moderator 108*a* to access a higher level of details for a better understanding of what XR device user 110*a* consumes. Having floating windows 130*b*, 132*b* and 134*b* within map 137, in the vicinity of XR device user representations 130*a*, 132*a* and 134*a*, respectively allows moderator 108*a* to have a clear overview of which XR device user is watching which stream and to visually diagnose the status of each XR device user in real time.

Figure 6:
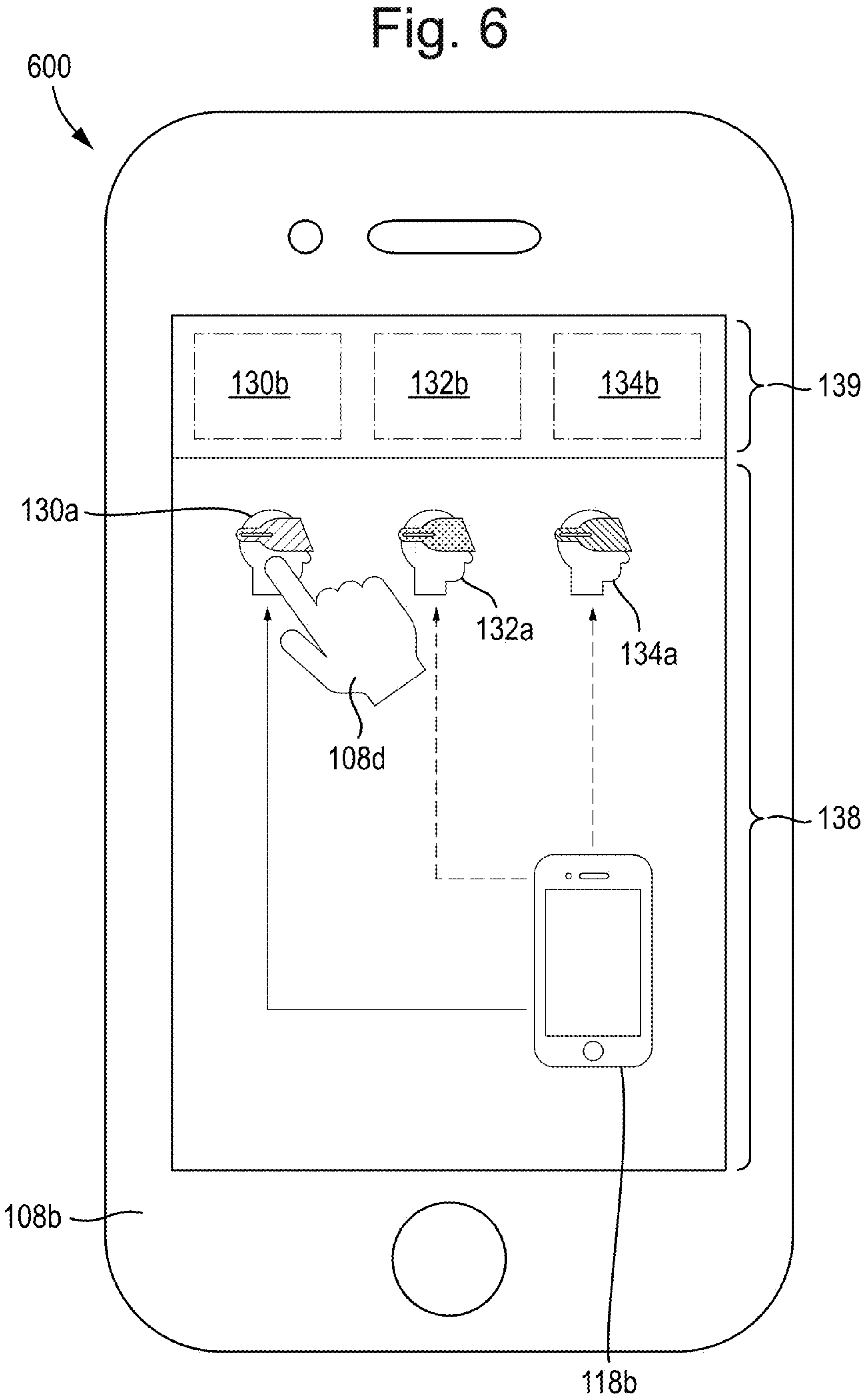
FIG. 6 illustrates an overview of a display of a moderator's apparatus, part of a system for accessing multiple replica streams in accordance with some implementations of the disclosure.

FIG. 6 illustrates an overview 600 of a display of a moderator's apparatus 108*b*, part of a system for accessing multiple replica streams in accordance with some implementations of the disclosure. The system in question is the same as those of FIGS. 1 to 5. The first, second, third or fourth scenario of FIG. 1 may apply to FIG. 6. For the sake of clarity, stream database 102, communication network 104, server 106, components 110*c*, 112*c*, 114*c* and 108*c* enabling direct device-to-device communication between the moderator's apparatus 108*b* and XR devices 110*a*, 112*a* and 114*a* are not shown in FIG. 6. In FIG. 6, the moderator's apparatus 108*b* is a mobile phone that comprises a display, at least one camera able to capture the surrounding environment and an IMU. However, other types of moderator's apparatus may be used in the situation depicted in FIG. 6: the moderator's apparatus 108*b* may comprise a phone, a tablet, a XR device, a laptop, a computer or any combination thereof, as long as it has a display, at least one camera able to capture the surrounding environment and an IMU.

The spatial coordinates of XR devices 110*a*, 112*a* and 114*a* may be determined using various technologies mentioned earlier e.g., LIDAR, RFID, IMU, VIO, Bluetooth. The spatial coordinates and orientation (or tilt) of the moderator's apparatus 108*b* may be determined using various technologies mentioned earlier (e.g., IMU, VIO, Bluetooth). Additionally, for instance, LIDAR data, IMU data and camera-generated video data of the moderator's device 108*b* and IMU data and camera-generated video data of XR devices 110*a*, 112*a* and 114*a* (if XR devices are equipped with VIO technology) may be used by SLAM algorithms to build a map representing the real-time locations of the moderator's apparatus and the plurality of XR devices.

The display of the moderator's apparatus 108*b* represents a map 138 representing the real-time locations of each XR device user 110*a*, 112*a* and 114*a* and of moderator 108*a*. In map 138, XR device users 110*a*, 112*a* and 114*a* are depicted as XR device user representations 130*a*, 132*a* and 134*a*, respectively and moderator 108*a* is represented as the moderator representation 118*b*. Fixed windows 130*b*, 132*b* and 134*b* are located outside map 138, and arranged in a row 139. Streams 110*b*, 112*b* and 114*b* are simultaneously presented within fixed windows 130*b*, 132*b* and 134*b*, respectively. Using cursor 108*d*, moderator 108*a* (not shown here) selects either XR device user representation 130*a* or fixed window 130*b* so as to present stream 110*b* (mapped to XR device 110*a*) on the full display of the moderator's apparatus 108*b*, allowing moderator 108*a* to access a higher level of details for a better understanding of what XR device user 110*a* consumes. Having floating windows 130*b*, 132*b* and 134*b* outside map 138 (in row 139), in the vicinity of XR device user representations 130*a*, 132*a* and 134*a*, respectively allows moderator 108*a* to have a clear overview of which XR device user is watching which stream and to visually diagnose the status of each XR device user in real time.

Figure 7:
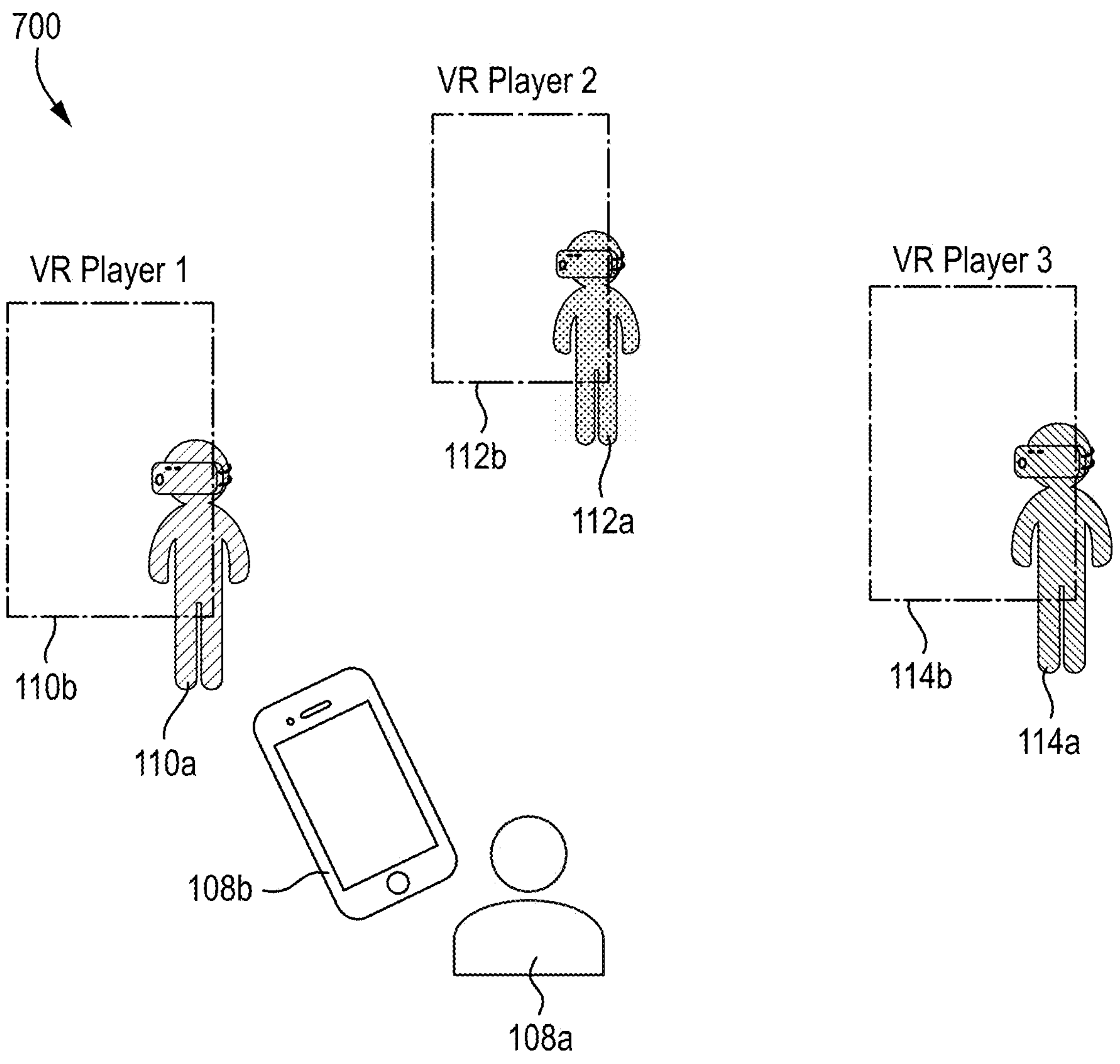
FIG. 7 represents an overview of a system for accessing multiple replica streams in accordance with some implementations of the disclosure.

FIG. 7 represents an overview of a system 700 for accessing multiple replica streams in accordance with some implementations of the disclosure. The system in question is the same as those of FIGS. 1 to 6. The first, second, third or fourth scenario of FIG. 1 may apply to FIG. 7. For the sake of clarity, stream database 102, communication network 104, server 106, components 110*c*, 112*c*, 114*c* and 108*c* enabling direct device-to-device communication between the moderator's apparatus 108*b* and XR devices 110*a*, 112*a* and 114*a* are not shown in FIG. 7. In FIG. 7, the moderator's apparatus 108*b* is a mobile phone that comprises a display, at least one camera able to capture the surrounding environment and an IMU. However, other types of moderator's apparatus may be used in the situation depicted in FIG. 7: the moderator's apparatus 108*b* may comprise a phone, a tablet, a XR device, a laptop, a computer or any combination thereof, as long as it has a display, at least one camera able to capture the surrounding environment and an IMU.

FIG. 7 is similar to FIG. 2, except for their spatial arrangement of XR device users 110*a*, 112*a* and 114*a* and moderator 108*a*. In effect, the spatial arrangement of XR device users 110*a*, 112*a* and 114*a* and moderator 108*a* shown in FIG. 7 is different from the spatial arrangement of XR device users 110*a*, 112*a* and 114*b* and moderator 108*a* shown in FIG. 2: the spatial coordinates of XR devices users 110*a*, 112*a* and 114*a* in FIG. 7 are different from the spatial coordinates of XR device users 110*a*, 112*a* and 114*a* in FIG. 2, while the spatial coordinates of moderator 108*a* remains the same irrespective of the figure considered. Additionally, the trajectory and a related aiming cross that are to materialize the selection of XR device user 110*a* by moderator 108*a* is not shown in FIG. 7. The description related to FIG. 2 applies to FIG. 7 too.

Figure 8:
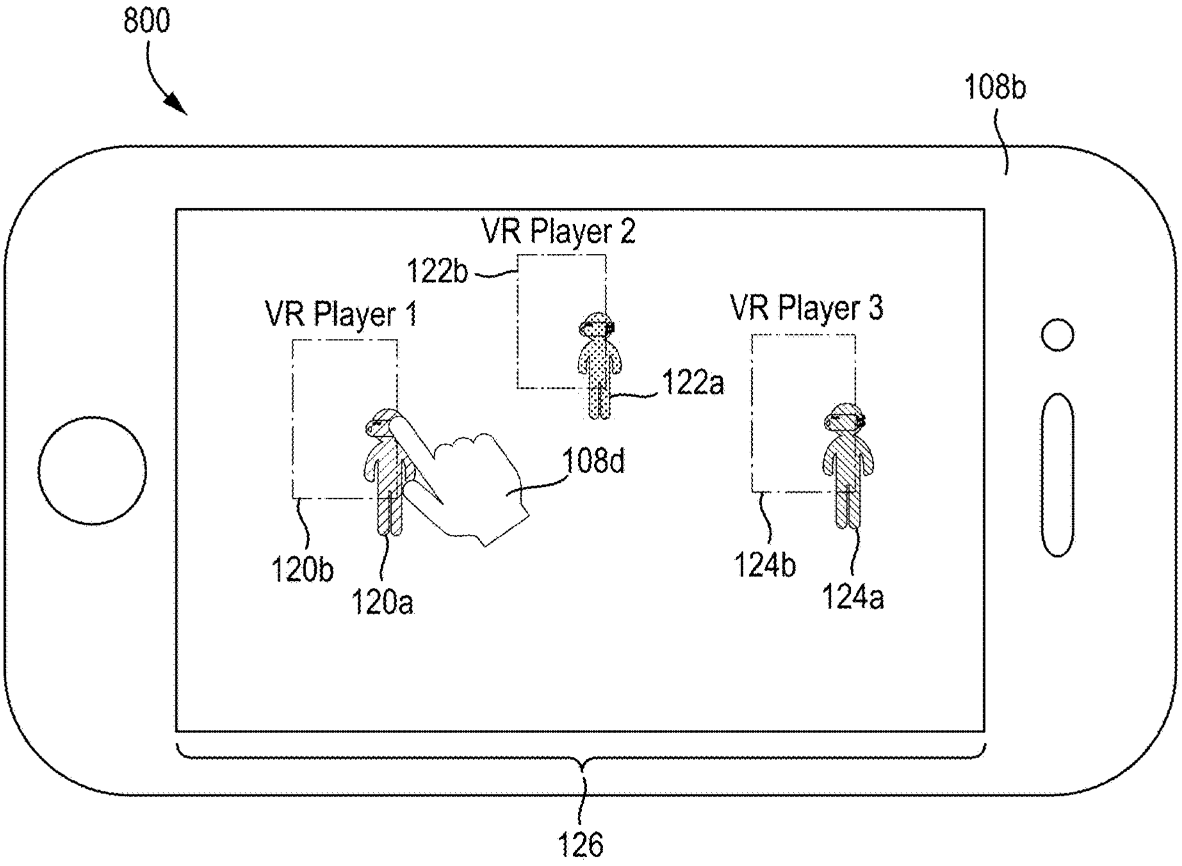
FIG. 8 shows an overview of a display of a moderator's apparatus, part of a system for accessing multiple replica streams in accordance with some implementations of the disclosure.
Figure 9:
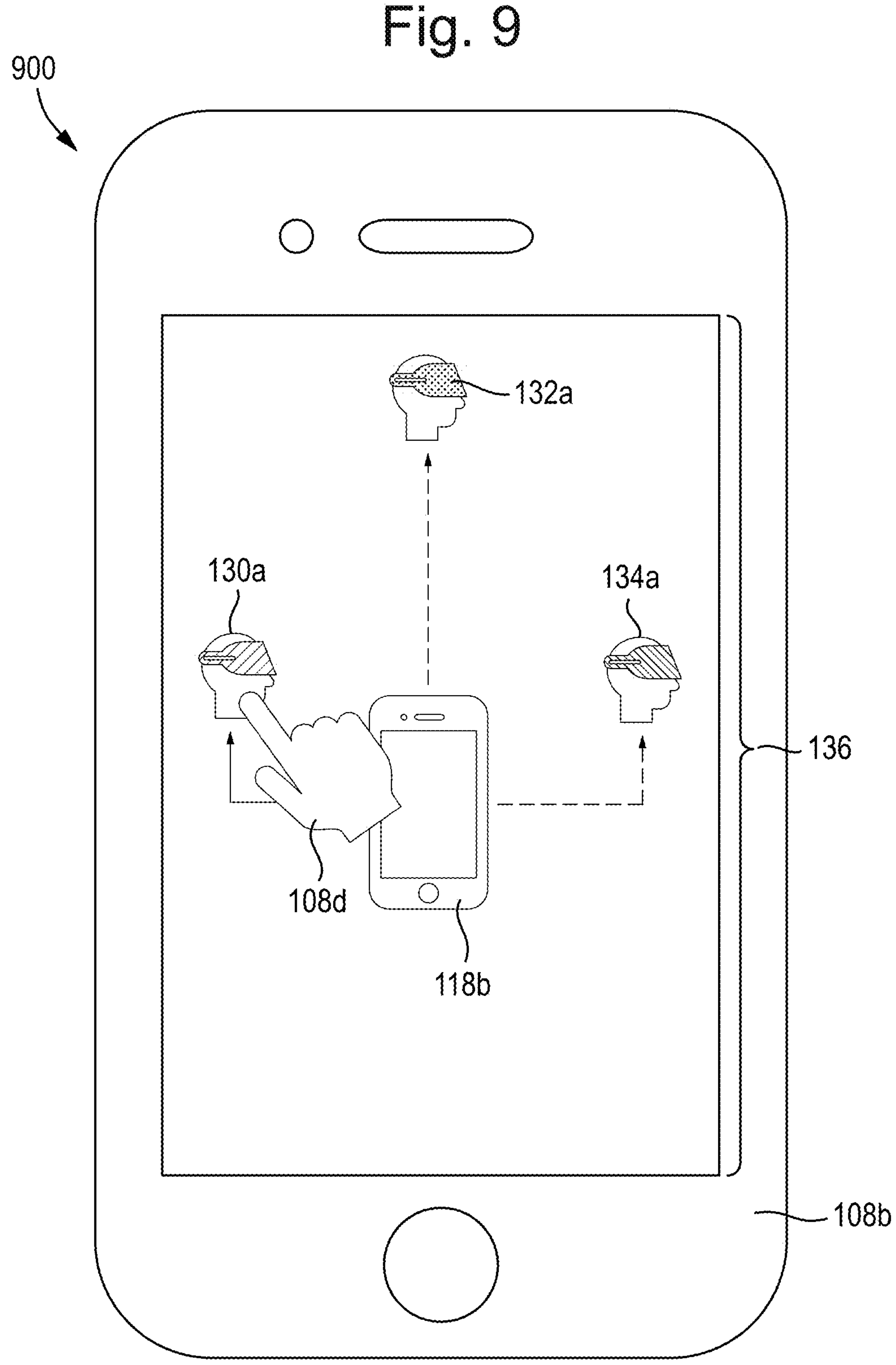
FIG. 9 depicts an overview of a display of a moderator's apparatus, part of a system for accessing multiple replica streams in accordance with some implementations of the disclosure.
Figure 10:
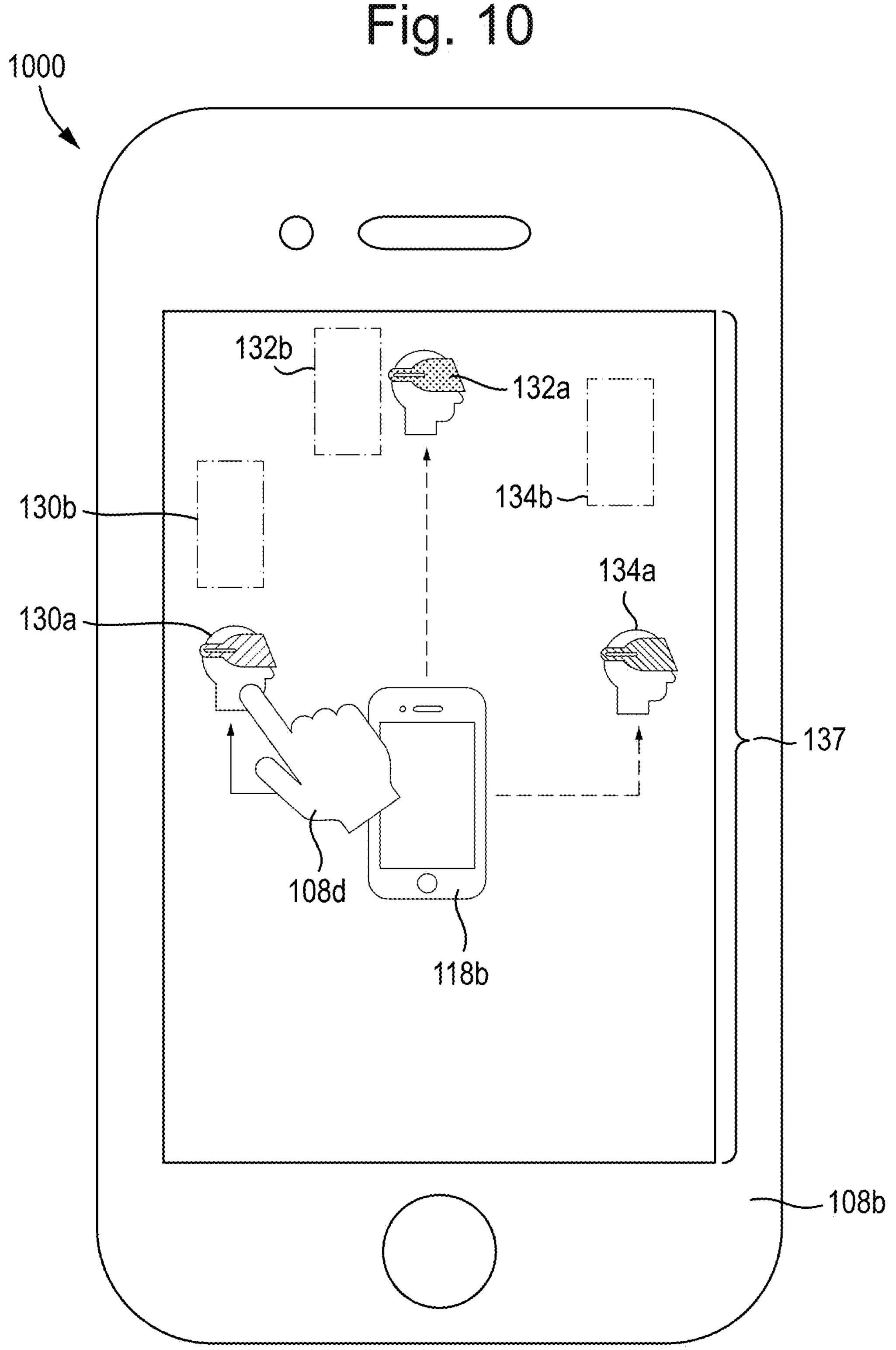
FIG. 10 illustrates an overview of a display of a moderator's apparatus, part of a system for accessing multiple replica streams in accordance with some implementations of the disclosure.
Figure 11:
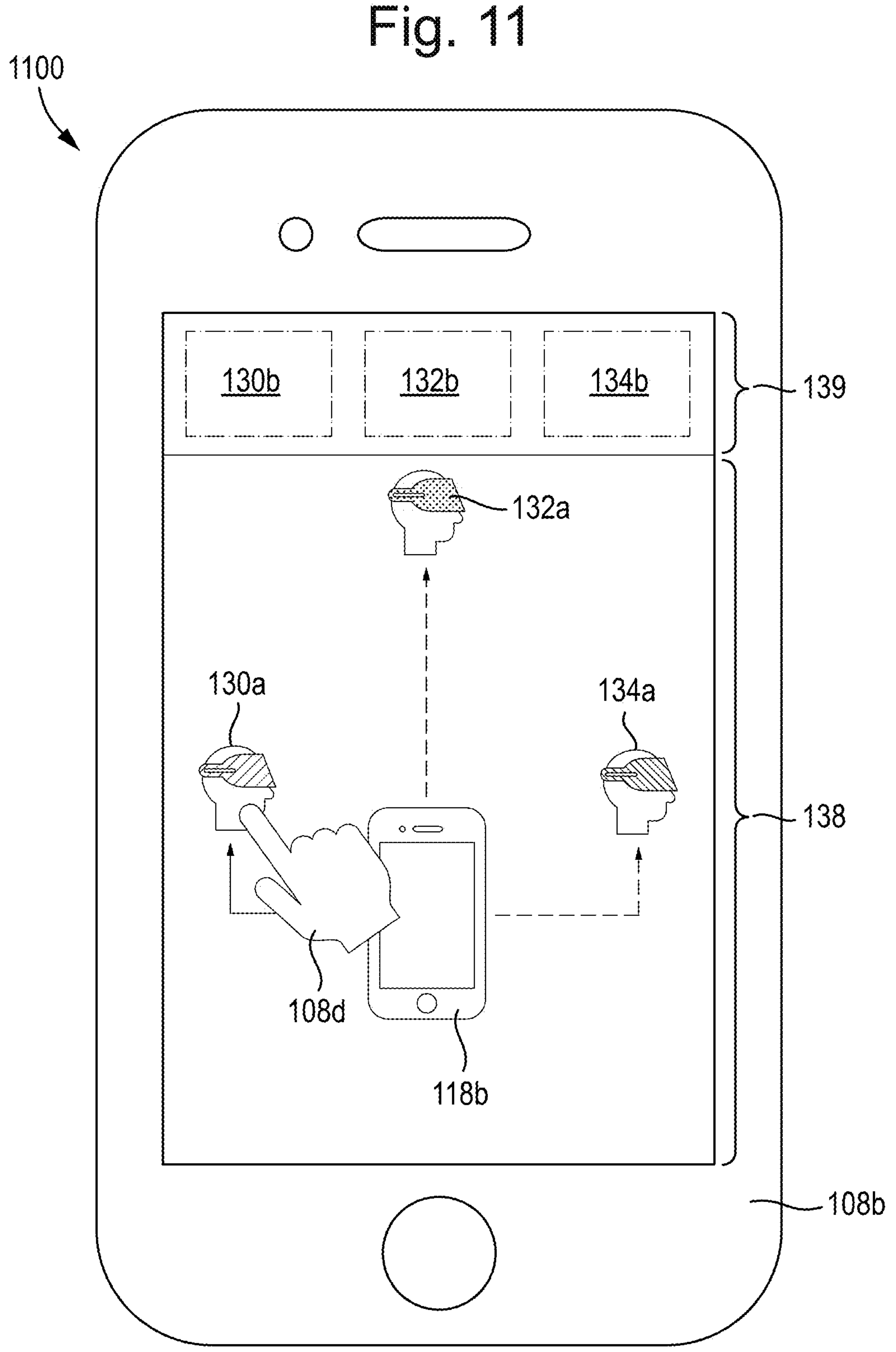
FIG. 11 represents an overview of a display of a moderator's apparatus, part of a system for accessing multiple replica streams in accordance with some implementations of the disclosure.

FIGS. 8 to 11 rely on the spatial arrangement of XR device users 110*a*, 112*a* and 114*a* and moderator 108*a* shown in FIG. 7. The real-time locations of the XR device user representations 120*a*, 122*a* and 124*a* of FIG. 8 and the real-time locations of XR device user representations 130*a*, 132*a* and 134*a* of FIGS. 9 to 11 are based on the real-time locations of XR device users 110*a*, 112*a* and 114*a* of FIG. 7. Similarly, the real-time location of the moderator device representation 118*b* in FIGS. 9 to 11 is based on the real-time location of the moderator's apparatus 108*b* of FIG. 7.

FIG. 8 shows an overview 800 of a display of a moderator's apparatus 108*b*, part of a system for accessing multiple replica streams in accordance with some implementations of the disclosure. FIG. 8 is similar to FIG. 3, except for their spatial arrangement of XR device user representations 120*a*, 122*a* and 124*a* and moderator 108*a*. The description related to FIG. 3 applies to FIG. 8. The first, second, third or fourth scenario of FIG. 1 may apply to FIG. 8.

FIG. 9 depicts an overview 900 of a display of a moderator's apparatus 108*b*, part of a system for accessing multiple replica streams in accordance with some implementations of the disclosure. FIG. 9 is similar to FIG. 4, except for their spatial arrangement of XR device users 130*a*, 132*a* and 134*a* and moderator 108*a*. The description related to FIG. 4 applies to FIG. 9. The first, second, third or fourth scenario of FIG. 1 may apply to FIG. 9.

FIG. 10 illustrates an overview 1000 of a display of a moderator's apparatus, part of a system for accessing multiple replica streams in accordance with some implementations of the disclosure. FIG. 10 is similar to FIG. 5, except for their spatial arrangement of XR device users 130*a*, 132*a* and 134*a* and moderator 108*a*. The description related to FIG. 5 applies to FIG. 10. The first, second, third or fourth scenario of FIG. 1 may apply to FIG. 10.

FIG. 11 represents an overview 1100 of a display of a moderator's apparatus, part of a system for accessing multiple replica streams in accordance with some implementations of the disclosure. FIG. 11 is similar to FIG. 6, except for their spatial arrangement of XR device users 130*a*, 132*a* and 143*a* and moderator 108*a*. The description related to FIG. 6 applies to FIG. 11. The first, second, third or fourth scenario of FIG. 1 may apply to FIG. 11.

Figure 12:
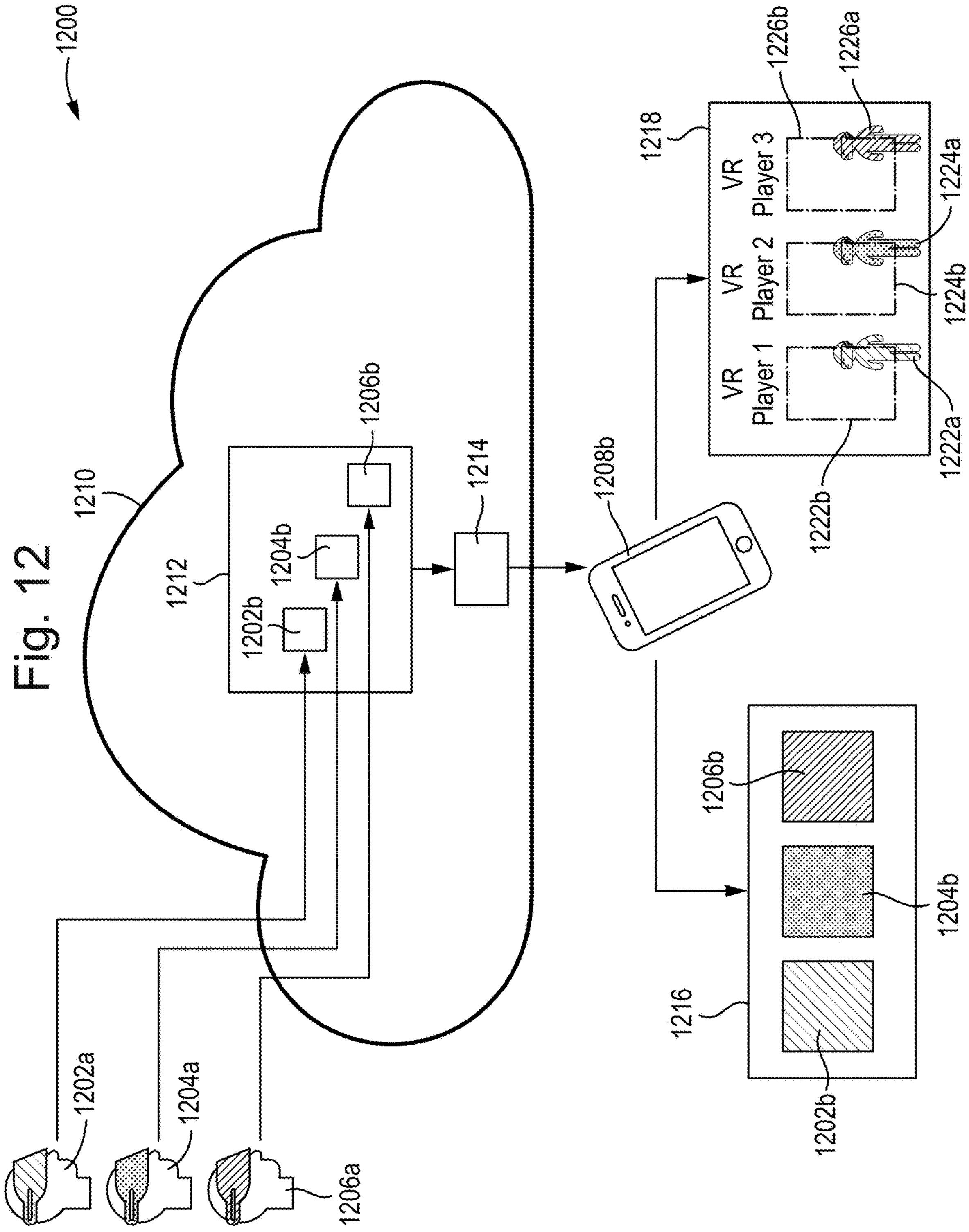
FIG. 12 shows an overview of a system for accessing multiple streams rendered by VR displays in accordance with some implementations of the disclosure.

FIG. 12 shows an overview of a system 1200 for accessing multiple VR display-rendered streams in accordance with some implementations of the disclosure. System 1200 comprises VR displays 1202*a*, 1204*a* and 1206*a*, cloud service 1210, module 1212 for mixing and encoding video into the user requested screen layout, stream service 1214 and a moderator's apparatus 1208*b*. The moderator's apparatus 1208*b* controlled by moderator 1208*a* (not shown in FIG. 12) may display different view modes selected via a user interface. One of the view modes is a split screen 1216 presenting streams 1202*b*, 1204*b* and 1206*b* (mapped to VR displays 1202*a*, 1204*a* and 1206*a*, respectively), each in a fixed window next to each other. By selecting one of the available streams 1202*b*, 1204*b* and 1206*b*, moderator 1208*a* (not shown here) is able to consume the selected stream (e.g., stream 1202*b*, stream 1204*b* or stream 1206*b*) on the full display of the moderator's apparatus 1208*b*. Another one of the view modes is a spatial screen 1218 wherein the moderator's apparatus 108*b* shows an image representing the camera-captured scene in which VR display user representations 1222*a*, 1224*a* and 1226*a* (corresponding to VR display users 1202*a*, 1204*a* and 1206*a*, respectively) are "accompanied" by overlays 1222*b*, 1224*b* and 1226*b*, respectively. Overlays 1222*b*, 1224*b* and 1226*b* simultaneously present streams 1202*b*, 1204*b* and 1206*b*, respectively. Streams 1202*b*, 1204*b* and 1206*b* are mapped to VR displays 1202*a*, 1204*a* and 1206*a*, respectively. VR displays 1202*a*, 1204*a* and 1206*a* correspond to VR display user representation 1222*a*, 1224*a* and 1226*a*. By selecting one of the available overlays 1222*b*, 1224*b* and 1226*b* or one of the available VR display user representations 1222*a*, 1224*a* and 1226*a*, moderator 1208*a* (not shown here) is able to consume the selected stream (e.g., stream 1202*b*, stream 1204*b* or stream 1206*b*) on the full display of the moderator's apparatus 1208*b*.

Cloud service 1210 may comprise a communication network, a server and a stream database (not shown in FIG. 12). The server may receive all the VR display-rendered streams at all times. Alternatively, the server may receive the VR display-rendered streams only on demand due to bandwidth limitations dictated by the number of VR displays. Stream database 102 may store the VR display-rendered streams. Upon request to the server, the moderator's apparatus 1208*b* may select one of the available VR displays (e.g., VR displays 1202*a*, 1204*a* and 1206*a*) to receive the related stream (e.g., streams 1202*b*, 1204*b* or 1206*b*) through communication network. The request may use the spatial coordinates of the selected VR display and/or the URL related to the stream mapped to the selected VR display. The first, second, third or fourth scenario of FIG. 1 may apply to FIG. 12.

Figure 13:
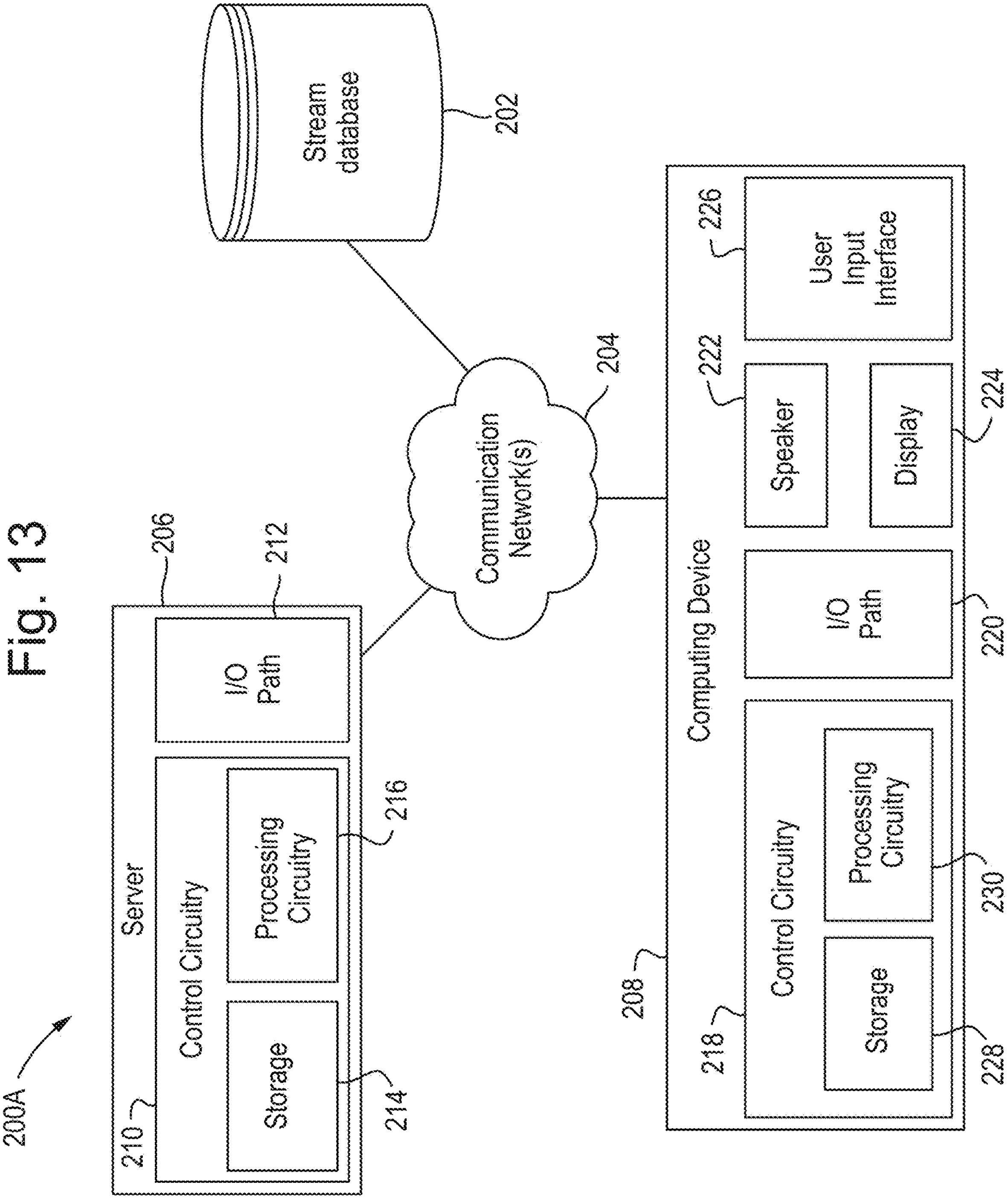
FIG. 13 depicts an overview of a system for accessing multiple replica streams in accordance with some implementations of the disclosure.

FIG. 13 is an illustrative block diagram showing example system 200A configured to access multiple replica streams in accordance with some implementations of the disclosure. Although FIG. 13 shows system 200A as including a number and configuration of individual components, in some examples, any number of the components of system 200A may be combined and/or integrated as one device, e.g., the moderator's apparatus 108*b* or 1208*b*. System 200A includes stream database 202 (e.g., stream database 102), server 206 (e.g., server 106), and computing device 208, each of which is communicatively coupled to communication network 204, which may be the Internet or any other suitable network or group of networks. In some examples, system 200A excludes server 206, and functionality that would otherwise be implemented by server 206 is instead implemented by other components of system 200A, such as computing device 208. In still other examples, server 206 works in conjunction with computing device 208 to implement certain functionality described herein in a distributed or cooperative manner.

Figure 14:
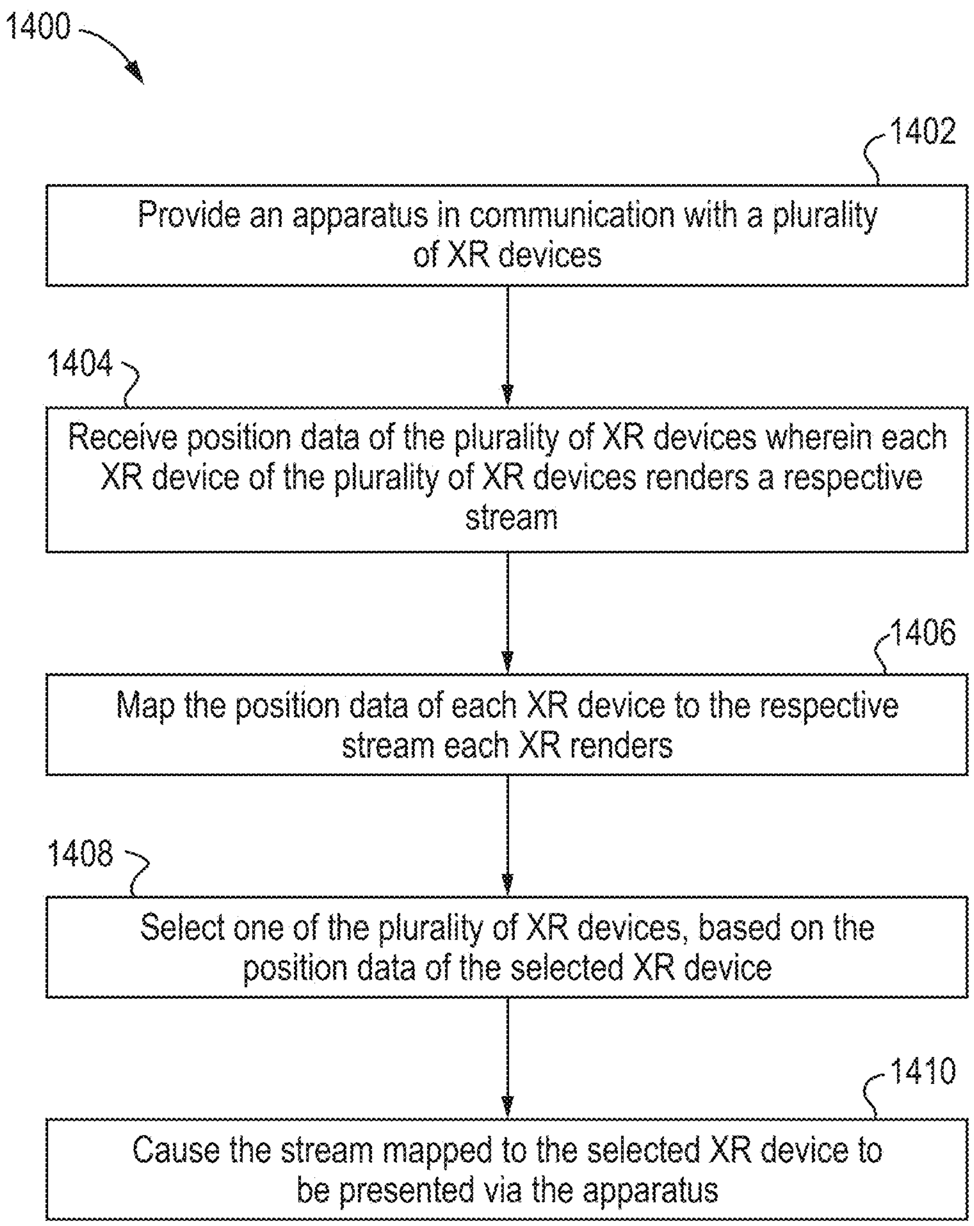
FIG. 14 illustrates a flowchart describing a process for accessing multiple replica streams in accordance with some implementations of the disclosure.

FIG. 14 illustrates a flowchart describing a process 1400 for accessing multiple replica streams in accordance with some implementations of the disclosure. The process 1400 allows for accessing multiple replica streams (e.g., streams 110*b*, 112*b*, 114*b*, 1202*b*, 1204*b* or 1206*b*) from an apparatus (e.g., the moderator's apparatus 108*b* or 1208*b*) in order for the moderator (e.g. moderator 108*a* or 1208*a*) to consume at least one of the replica streams. The apparatus (e.g., the moderator's apparatus 108*b* or 1208*b*) may comprise a phone, a tablet, a XR device, a laptop, a computer or any combination thereof. The moderator's apparatus (e.g., the moderator's apparatus 108*b* or 1208*b*) may comprise a display, at least one camera able to capture the surrounding environment and an IMU. For the avoidance of doubt, the term 'control circuitry' used in the below description applies broadly to the control circuitry outlined above with reference to FIG. 1 and/or FIG. 12 and/or FIG. 13. For example, control circuitry may comprise control circuitry of the moderator's apparatus 108*b* (with reference to FIG. 1) or the moderator's apparatus 1208*b* (with reference to FIG. 12) and control circuitry of server 106 (with reference to FIG. 1) and/or server 206 working either alone or in some combination with computing device 208 (with reference to FIG. 13).

At 1402, control circuitry provides an apparatus (e.g., moderator's apparatus 108*b* or 1208*b*) in communication with a plurality of XR devices (e.g., XR devices 110*a*, 112*a*, 114*a*, 1202*a*, 1204*a* and 1206*a*). This communication may be mediated via a communication network (e.g., communication network 104, 204 or 1210) involving the use of a server e.g., server 106 or 210 (Refer to the first and second scenarios). Alternatively, this communication may be mediated via a combination of two communication networks involving each a server (Refer to the third scenario). Alternatively, this communication may be mediated via a communication network (e.g., communication network 104, 204 or 1210) involving the use of a server (e.g., server 106 or 210), and a direct device-to-device communication e.g., duplets 108*c*/110*c*, 108*c*, 112*c* or 108*c*/114*c* (Refer to the fourth scenario).

At 1404, control circuitry receives position data (e.g., spatial coordinates) of the plurality of XR devices (e.g., XR devices 110*a*, 112*a*, 114*a*, 1202*a*, 1204*a* and 1206*a*) wherein each XR device of the plurality of XR devices renders a respective stream (e.g., streams 110*b*, 112*b*, 114*b*, 1202*b*, 1204*b* or 1206*b*). Position data (e.g., spatial coordinates) of XR devices 110*a*, 112*a* and 114*a* may be determined in real-time using various technologies mentioned earlier e.g., LIDAR, RFID, IMU, VIO, Bluetooth. The position data of the plurality of XR devices may be fed to SLAM algorithms to build a map representing the real-time locations of the plurality of XR devices.

At 1406, control circuitry maps the position data (e.g., spatial coordinates) of each XR device (e.g., XR devices 110*a*, 112*a*, 114*a*, 1202*a*, 1204*a* or 1206*a*) to the respective stream (e.g., streams 110*b*, 112*b*, 114*b*, 1202*b*, 1204*b* or 1206*b*) each XR renders.

At 1408, control circuitry selects one of the plurality of XR devices, based on the position data (e.g., spatial coordinates) of the selected XR device (e.g., XR devices 110*a*, 112*a*, 114*a*, 1202*a*, 1204*a* or 1206*a*). There are three main options to select one of the plurality of XR devices, some of those options presenting some variants (See FIGS. 2 to 6 and 7 to 11).

At 1410, control circuitry causes the stream (e.g., streams 110*b*, 112*b*, 114*b*, 1202*b*, 1204*b* or 1206*b*) mapped to the selected XR device (e.g., XR devices 110*a*, 112*a*, 114*a*, 1202*a*, 1204*a* or 1206*a*) to be presented via the apparatus (e.g., the moderator's apparatus 108*b* or 1208*b*). The presentation of the stream mapped to the selected XR device, via the moderator's apparatus, results from the occurrence of either the first, second, third or fourth scenario mentioned earlier.

Figure 15A:
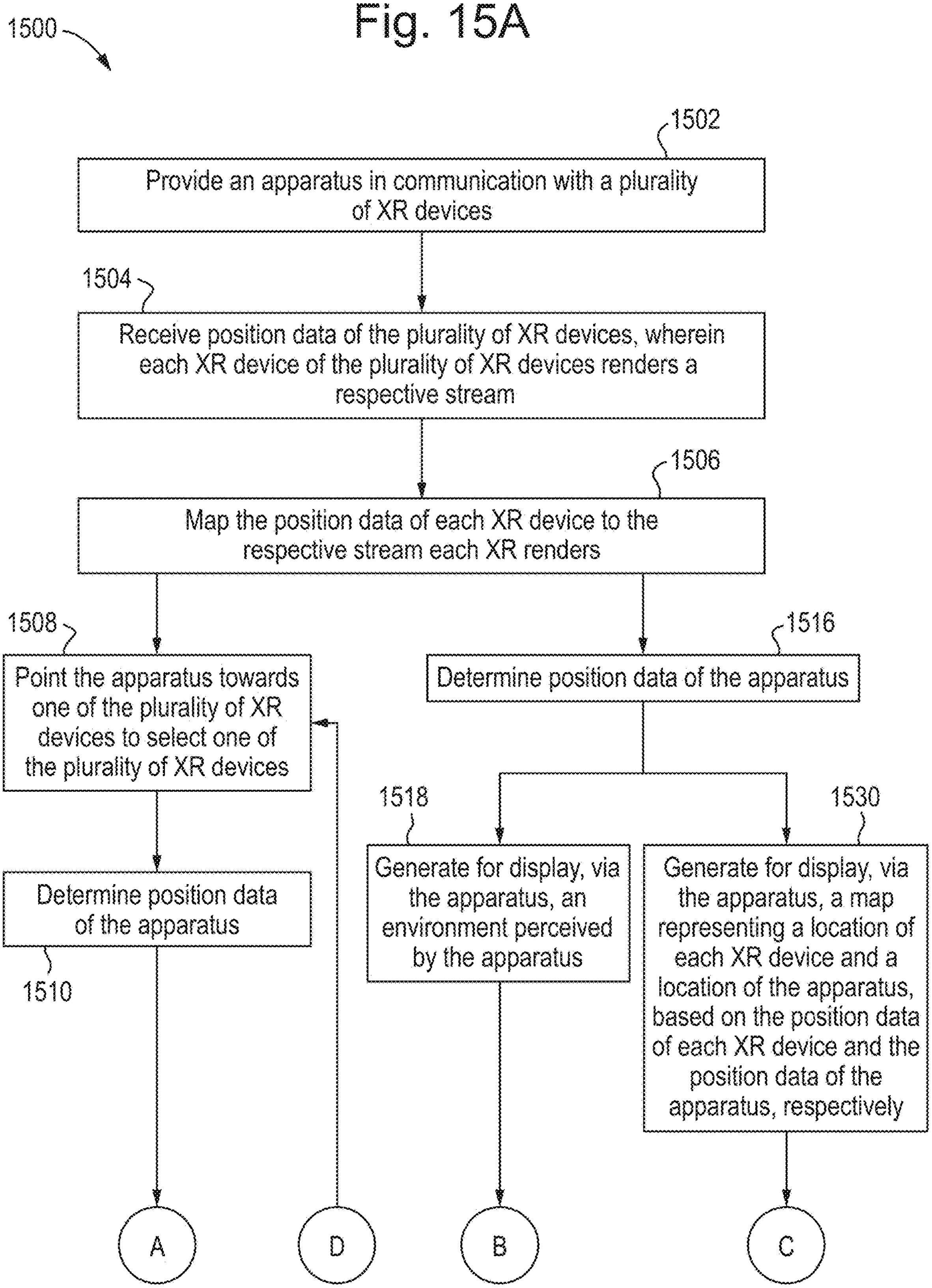
FIGS. 15A, 15B and 15C shows a flowchart representing a process for accessing multiple replica streams in accordance with some implementations of the disclosure.
Figure 15B:
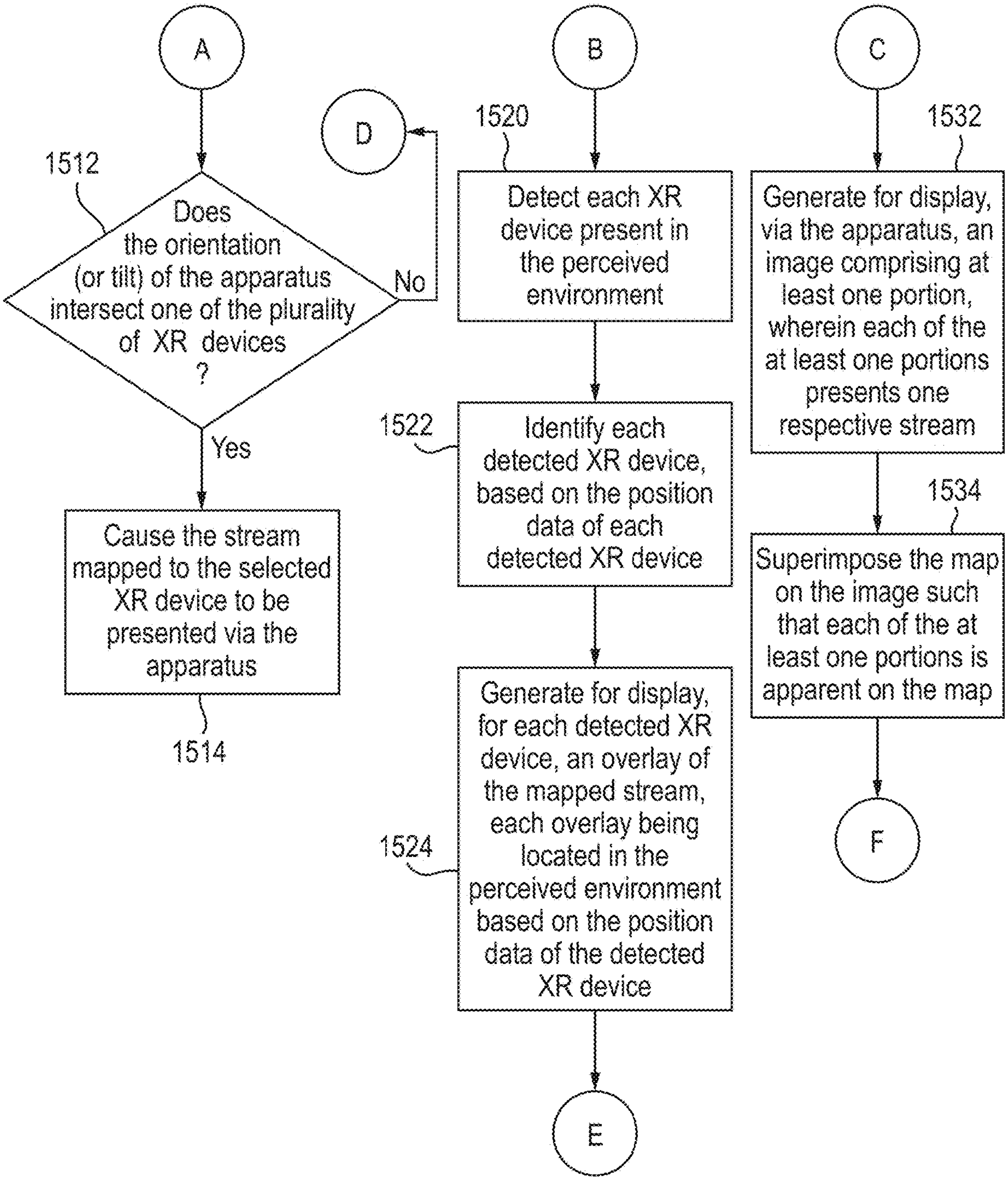
Figure 15C:
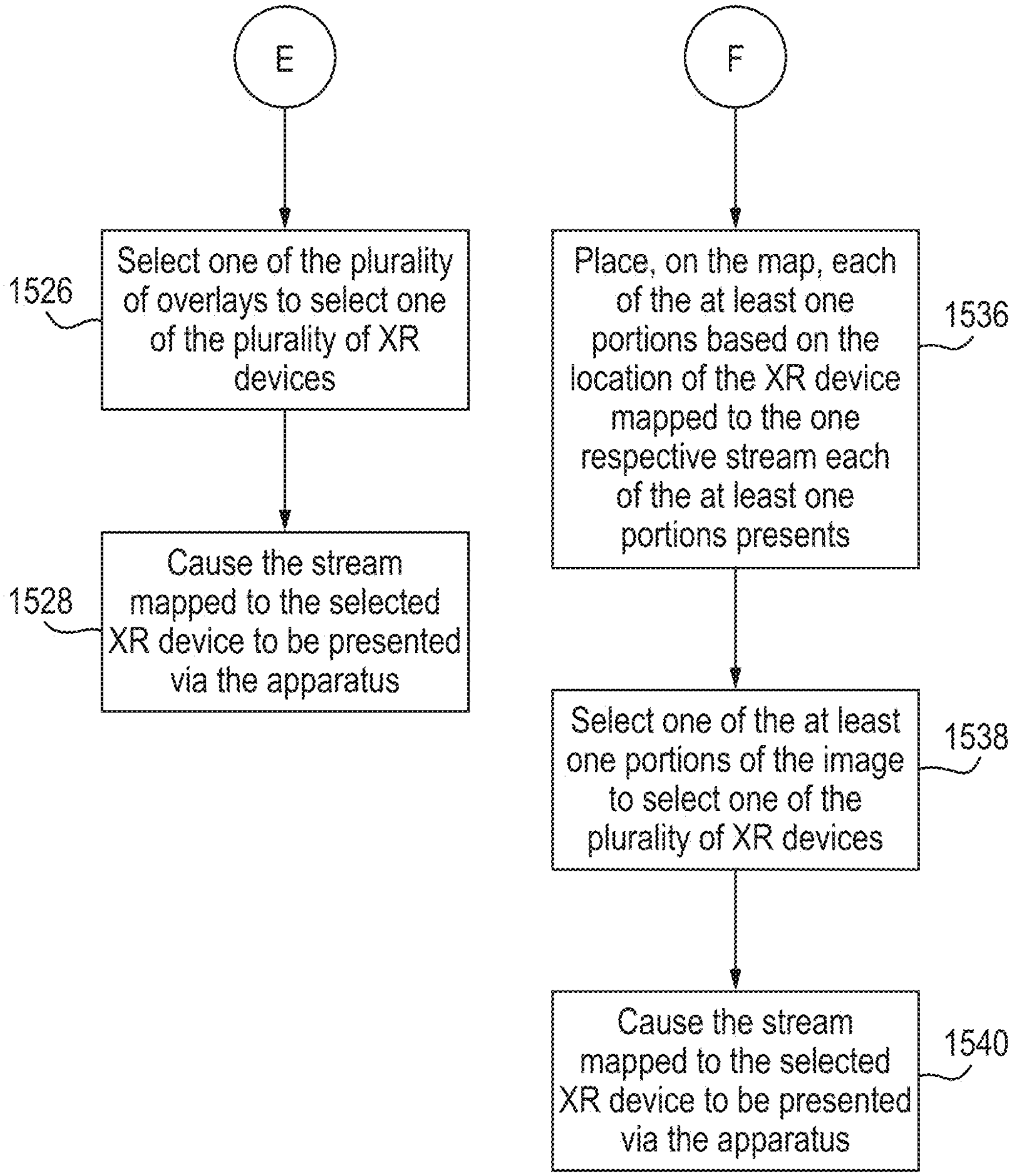

FIG. 15A to 15C depict a flowchart representing a process 1500 for accessing multiple replica streams in accordance with some implementations of the disclosure.

The process 1500 allows for accessing multiple replica streams (e.g., streams 110*b*, 112*b*, 114*b*, 1202*b*, 1204*b* or 1206*b*) from an apparatus (e.g., the moderator's apparatus 108*b* or 1208*b*) in order for the moderator (e.g., moderator 108*a* or 1208*a*) to consume at least one of the replica streams. The selection of one replica stream may be implemented via three different routes (e.g., from 1508 to 1514, from 1516 through 1518 to 1528 and from 1516 through 1530 to 1540). The moderator's apparatus (e.g., the moderator's apparatus 108*b* or 1208*b*) may comprise a phone, a tablet, a XR device, a laptop, a computer or any combination thereof. The moderator's apparatus (e.g., the moderator's apparatus 108*b* or 1208*b*) may comprise a display, at least one camera able to capture the surrounding environment and an IMU.

At 1502, control circuitry provides an apparatus (e.g., moderator's apparatus 108*b* or 1208*b*) in communication with a plurality of XR devices (e.g., XR devices 110*a*, 112*a*, 114*a*, 1202*a*, 1204*a* and 1206*a*). This communication may be mediated via a communication network (e.g., communication network 104, 204 or 1210) or a direct device-to-device communication (e.g., duplets 108*c*/110*c*, 108*c*, 112*c* or 108*c*/114*c*). This communication may be mediated via a communication network (e.g., communication network 104, 204 or 1210) involving the use of a server e.g., server 106 or 210 (Refer to the first and second scenarios). Alternatively, this communication may be mediated via a combination of two communication networks involving each a server (Refer to the third scenario). Alternatively, this communication may be mediated via a communication network (e.g., communication network 104, 204 or 1210) involving the use of a server (e.g., server 106 or 210), and a direct device-to-device communication e.g., duplets 108*c*/110*c*, 108*c*, 112*c* or 108*c*/114*c* (Refer to the fourth scenario).

At 1504, control circuitry receives position data (e.g., spatial coordinates) of the plurality of XR devices (e.g., XR devices 110*a*, 112*a*, 114*a*, 1202*a*, 1204*a* and 1206*a*) wherein each XR device of the plurality of XR devices renders a respective stream (e.g., streams 110*b*, 112*b*, 114*b*, 1202*b*, 1204*b* or 1206*b*). Position data (e.g., spatial coordinates) of XR devices 110*a*, 112*a* and 114*a* may be determined in real-time using various technologies mentioned earlier e.g., LIDAR, RFID, IMU, VIO, Bluetooth. The position data of the plurality of XR devices may be fed to SLAM algorithms to build a map representing the real-time locations of the plurality of XR devices.

At 1506, control circuitry maps the position data (e.g., spatial coordinates) of each XR device (e.g., XR devices 110*a*, 112*a*, 114*a*, 1202*a*, 1204*a* or 1206*a*) to the respective stream (e.g., streams 110*b*, 112*b*, 114*b*, 1202*b*, 1204*b* or 1206*b*) each XR renders.

Two alternatives (i.e. 1508 or 1516) for selecting one of the plurality of XR devices are then available.

FIG. 15A shows steps 1508 and 1510 as separate steps such that steps 1508 and 1510 are implemented by the moderator (e.g., moderator 108*a* or 1208*a*) and the control circuitry, respectively. FIG. 15A should have shown a unique step 1508/1510 labelled as "Determine the position data of the apparatus pointed towards one of the plurality of XR devices to select one of the plurality of XR devices". At 1508/1510, control circuitry determines the position data (e.g., spatial coordinates, orientation (or tilt)) of the moderator's apparatus (e.g., moderator's apparatus 108*b* or 1208*b*) pointed by a moderator (e.g., moderator 108*a* or 1208*a*) towards one of the plurality of XR devices to select one of the plurality of XR devices.

At 1512, control circuitry determines whether or not the orientation (or tilt) of the apparatus (e.g., the moderator's apparatus 108*b* or 1208*b*) intersects one of the plurality of XR devices. If it is the case, it leads to 1514 otherwise it leads back to 1508/1510.

At 1514, control circuitry causes the stream mapped to the selected XR device to be presented via the apparatus. The presentation of the stream mapped to the selected XR device, via the moderator's apparatus, results from the occurrence of either the first, second, third or fourth scenario mentioned earlier.

At 1516, control circuitry determines the position data (e.g., spatial coordinates, orientation (or tilt)) of the apparatus (e.g., the moderator's apparatus 108*b* or 1208*b*).

Two alternatives (i.e. 1518 or 1530) for selecting one of the plurality of XR devices are then available.

At 1518, control circuitry generates for display, via the apparatus (e.g., the moderator's apparatus 108*b* or 1208*b*), an environment perceived by the apparatus. The apparatus may be equipped with a camera trained to visually detect XR devices or assisted by an image-treatment software allowing for capturing the real scene facing the camera of the apparatus.

At 1520, control circuitry detects each XR device present in the perceived environment, using an image-treatment software able to visually recognize XR devices (or even XR device users) on images captured by the camera.

At 1522, control circuitry identifies each detected XR device, based on the position data of each detected XR device. By cross-referencing the real-time locations of the detected XR devices in the perceived environment and the position data of the plurality of the XR devices (both using the position data of the moderator's apparatus as a reference), it is possible to identify each detected XR device relative to the moderator's apparatus.

At 1524, control circuitry generates for display, for each detected XR device, an overlay of the mapped stream, each overlay being located in the perceived environment based on the position data of the detected XR device. FIGS. 3 and 8 illustrate the result of step 1524.

At 1526, control circuitry selects one of the plurality of overlays to select one of the plurality of XR devices, based on an input from the moderator (e.g., moderator 108*a* or 1208*a*).

At 1528, control circuitry causes the stream mapped to the selected XR device to be presented via the apparatus. The presentation of the stream mapped to the selected XR device, via the moderator's apparatus, results from the occurrence of either the first, second, third or fourth scenario mentioned earlier.

At 1530, control circuitry generates for display, via the apparatus, a map representing a real-time location of each XR device and a real-time location of the apparatus, based on the position data of each XR device and the position data of the apparatus, respectively. FIGS. 4 to 6 and 9 to 11 exemplify the result of step 1530.

At 1532, control circuitry generates for display, via the apparatus, an image comprising at least one portion, wherein each of the at least one portions presents one respective stream.

At 1534, control circuitry superimposes the map on the image such that each of the at least one portions is apparent on the map.

At 1536, control circuitry places, on the map, each of the at least one portions based on the real-time location of each XR device mapped to the one respective stream each of the at least one portions presents. FIGS. 5, 6, 10 and 11 exemplify the result of step 1536.

At 1538, control circuitry selects one of the at least one portions of the image to select one of the plurality of XR devices based on an input from the moderator (e.g., moderator 108*a* or 1208*a*).

At 1540, control circuitry causes the stream mapped to the selected XR device to be presented via the apparatus. The presentation of the stream mapped to the selected XR device, via the moderator's apparatus, results from the occurrence of either the first, second, third or fourth scenario mentioned earlier.

Irrespective of the way the moderator's apparatus select a XR device, the connection of the moderator's apparatus to the replica stream relating to the selected XR device enables two-ways interactions e.g., chat and/or voice communications, exclusively between the moderator's apparatus and the selected XR device, in order for the moderator to assist the XR device user and for the XR device user to explain any problem they are facing.

Additionally, the connection of the moderator's apparatus to the replica stream relating to the selected XR device enables one-way interactions from the moderator's apparatus to the XR device. For instance, the moderator's apparatus may be able to generate visual signs (e.g., arrows, road signs), via the XR device, directly on the stream being rendered by the selected XR device, in order to bring the XR device user's attention to a specific object or a specific location. The moderator's apparatus may be also able to take control of the viewpoint of the XR device in order for the moderator to bring the XR device user's attention to a specific place or specific object. Furthermore, the moderator's apparatus may be able to power off and on the XR device.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method, performed by a supervisory device, comprising:

receiving position data representing a plurality of positions of a plurality of extended reality (XR) devices and a plurality of respective replica stream data representing what is rendered by each respective XR device, wherein each of the plurality of XR devices is distinct from the supervisory device;

storing mapping data mapping the position data of each XR device of the plurality of XR devices to the respective replica stream data of the respective XR device received in association with the respective position data;

receiving an input identifying a selected position of a selected XR device; and based at least in part on the input identifying the selected position of the selected XR device:

identifying the respective replica stream data corresponding to the selected position of the selected XR device based on the mapping data;

making the identified respective replica stream data available to the supervisory device;

enabling the supervisory device to control a generation of one or more visual indicators on a display of the selected XR device, wherein the one or more visual indicators are distinct from an environment of the selected XR device; and enabling the supervisory device to override local control of the selected XR device to modify a viewpoint direction on the display of the selected XR device to focus on a point of interest in the environment of the selected XR device.

2. The method of claim 1, wherein the mapping data maps the position data of each XR device to connection information representing a network resource used for obtaining respective replica stream data for the selected XR device, the method further comprising receiving the connection information at the supervisory device.

3. The method of claim 1, wherein the respective replica stream data comprises a representation of the environment of the selected XR device overlaid with one or more visual elements generated by the selected XR device to augment the environment of the selected XR device, and each of the one or more visual elements generated by the selected XR device are distinct from the one or more visual indicators generated by the supervisory device.

4. The method of claim 2, wherein:

the network resource comprises a local server; and the local server, the supervisory device and the XR device are communicatively coupled to each other using a Local Area Network.

5. The method of claim 2, wherein:

the network resource comprises information indicative of a Wide Area Network; and the supervisory device and the plurality of XR devices are communicatively coupled via the Wide Area Network.

6. The method of claim 1, wherein the supervisory device and the selected XR device are communicatively coupled using direct device-to-device communication.

7. The method of claim 1, further comprising:

sending one or more messages to the selected XR device; and causing display of the one or more messages on the display of the selected XR device.

8. The method of claim 1, further comprising:

sending audio data to the selected XR device; and causing the selected XR device to generate audio output of the audio data sent from the supervisory device.

9. A method of claim 1, wherein the identified respective replica stream data is made available to the supervisory device in real-time.

10. The method of claim 1, wherein:

the one or more visual indicators comprise at least one of an arrow or road sign not previously generated for display on the display of the selected XR device and not physically present within the environment of the selected XR device; and the one or more visual indicators indicate a particular object or location physically present within the environment of the selected XR device.

11. The method of claim 1, further comprising:

configuring the supervisory device to be able to power the selected XR device on or off.

12. A system comprising a supervisory device, wherein the supervisory device comprises:

input/output circuitry configured to:

receive position data representing a plurality of positions of a plurality of extended reality (XR) devices and a plurality of respective replica stream data representing what is rendered by each respective XR device, wherein each of the plurality of XR devices is distinct from the supervisory device;

storage circuitry configured to store mapping data mapping the position data of each XR device of the plurality of XR devices to the respective replica stream data of the respective XR device received in association with the respective position data;

wherein the input/output circuitry is further configured to receive an input identifying a selected position of a selected XR device; and processing circuitry configured to, based on the input identifying the selected position:

identify the respective replica stream data corresponding to the selected position of the selected XR device based on the mapping data;

make the identified respective replica stream data available to the supervisory device;

enable the supervisory device to control a generation of one or more visual indicators on a display of the selected XR device, wherein the one or more visual indicators are distinct from an environment of the selected XR device; and enable the supervisory device to override local control of the selected XR device to modify a viewpoint direction on the display of the selected XR device to focus on a point of interest in the environment of the selected XR device.

13. The system of claim 12, wherein the mapping data maps the position data of each XR device to connection information representing a network resource used for obtaining respective replica stream data for the selected XR device, and the input/output circuitry is further configured to receive the connection information at the supervisory device.

14. The system of claim 12, wherein the respective replica stream data comprises a representation of the environment of the selected XR device overlaid with one or more visual elements generated by the selected XR device to augment the environment of the selected XR device, and each of the one or more visual elements generated by the selected XR device are distinct from the one or more visual indicators generated by the supervisory device.

15. The system of claim 13, wherein:

the network resource comprises a local server; and the local server, the supervisory device and the XR device are communicatively coupled to each other using a Local Area Network.

16. The system of claim 13, wherein:

the network resource comprises information indicative of a Wide Area Network; and the supervisory device and the plurality of XR devices are communicatively coupled via the Wide Area Network.

17. The system of claim 12, wherein the supervisory device and the selected XR device are communicatively coupled using direct device-to-device communication.

18. The system of claim 12, wherein the input/output circuitry is further configured to send audio data to the selected XR device, and the processing circuitry is further configured to cause display of the one or more messages on the display of the selected XR device.

19. The system of claim 12, wherein:

the one or more visual indicators comprise at least one of an arrow or road sign not previously generated for display on the display of the selected XR device and not physically present within the environment of the selected XR device; and the one or more visual indicators indicate a particular object or location physically present within the environment of the selected XR device.

20. The system of claim 12, wherein the processing circuitry is further configured to configure the supervisory device to be able to power the selected XR device on or off.

* * * * *